(12) United States Patent
Cui

(10) Patent No.: US 11,689,649 B2
(45) Date of Patent: Jun. 27, 2023

(54) SHOOTING METHOD AND TERMINAL

(71) Applicant: VIVO MOBILE COMMUNICATION CO., LTD., Guangdong (CN)

(72) Inventor: Xiaodong Cui, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 184 days.

(21) Appl. No.: 17/330,602

(22) Filed: May 26, 2021

(65) Prior Publication Data

US 2021/0281669 A1 Sep. 9, 2021

Related U.S. Application Data

(63) Continuation of application No. PCT/CN2019/116123, filed on Nov. 7, 2019.

(30) Foreign Application Priority Data

Nov. 28, 2018 (CN) .......................... 201811433213.8

(51) Int. Cl.
*H04M 1/02* (2006.01)
*G06F 1/16* (2006.01)
(Continued)

(52) U.S. Cl.
CPC .......... *H04M 1/0264* (2013.01); *G06F 1/163* (2013.01); *G06F 3/005* (2013.01); *H04N 23/51* (2023.01); *H04N 23/661* (2023.01); *H04N 25/00* (2023.01)

(58) Field of Classification Search
CPC .......... H04M 1/0264; H04M 1/72403; H04M 2250/52; G06F 1/163; G06F 3/005;
(Continued)

(56) References Cited

U.S. PATENT DOCUMENTS

2007/0139369 A1 6/2007 Kao
2011/0084915 A1 4/2011 Lee et al.
(Continued)

FOREIGN PATENT DOCUMENTS

CN 1774037 A 5/2006
CN 102231038 A 11/2011
(Continued)

OTHER PUBLICATIONS

Supplementary European Search Report regarding Patent Application No. 19890183.7-1209/3890303; PCT/CN2019/116123, dated Mar. 14, 2022.
(Continued)

*Primary Examiner* — Stephen P Coleman
(74) *Attorney, Agent, or Firm* — Harness, Dickey & Pierce, P.L.C.

(57) ABSTRACT

A shooting method includes: in a state in which a remote connection for sharing a shooting preview interface is established with the second terminal, receiving and displaying a first preview interface of the second terminal sent by the second terminal; receiving a first input performed by a user; and outputting first target shooting data in response to the first input, where the first target shooting data includes partial or all image information of the first preview interface, and the first target shooting data is a video or an image.

18 Claims, 15 Drawing Sheets

(51) Int. Cl.
*G06F 3/00* (2006.01)
*H04N 23/51* (2023.01)
*H04N 23/661* (2023.01)
*H04N 25/00* (2023.01)

(58) Field of Classification Search
CPC .. G06F 1/1686; G06F 1/1698; G06F 3/04845; G06F 3/04847; H04N 23/51; H04N 23/661; H04N 25/00; H04N 2201/0084; H04N 2201/325; H04N 2201/3273; H04N 2201/3278; H04N 1/00183; H04N 1/00347; H04N 1/32122; H04N 23/611; H04N 23/63; H04N 23/631; H04N 2201/0013; H04N 2201/0074; H04N 23/62
USPC .......................................................... 348/373
See application file for complete search history.

(56) References Cited

U.S. PATENT DOCUMENTS

2016/0085266 A1 3/2016 Lee et al.
2018/0234639 A1* 8/2018 Kim ..................... H04N 1/3876

FOREIGN PATENT DOCUMENTS

| CN | 103078924 A | | 5/2013 | |
|---|---|---|---|---|
| CN | 104796610 A | | 7/2015 | |
| CN | 105450848 A | | 3/2016 | |
| CN | 107197144 A | * | 9/2017 | ............ H04N 5/232 |
| CN | 107659769 A | | 2/2018 | |
| CN | 104796610 B | * | 5/2018 | |
| CN | 108874343 A | | 11/2018 | |
| CN | 109361869 A | | 2/2019 | |
| KR | 20170099330 A | | 8/2017 | |

OTHER PUBLICATIONS

International Search Report and Written Opinion of the International Searching Authority regarding International Patent Application No. PCT/CN2019/116123, dated Jan. 31, 2020. Translation provided by Bohui Intellectual Property.
First Office Action regarding Chinese Patent Application No. 201811433213.8, dated Nov. 22, 2019. Translation provided by Bohui Intellectual Property.
Second Office Action regarding Chinese Patent Application No. 201811433213.8, dated May 6, 2020. Translation provided by Bohui Intellectual Property.
Third Office Action regarding Chinese Patent Application No. 201811433213.8, dated Nov. 2, 2020. Translation provided by Bohui Intellectual Property.

* cited by examiner

SHOOTING METHOD AND TERMINAL

CROSS-REFERENCE OF RELATED APPLICATIONS

This application is a Bypass Continuation Application of PCT/CN2019/116123 filed on Nov. 7, 2019, which claims priority to Chinese Patent Application No. 201811433213.8, filed on Nov. 28, 2018, which are incorporated herein by reference in their entirety.

TECHNICAL FIELD

Embodiments of the present disclosure relate to the field of communications technologies, and in particular, to a shooting method and a terminal.

BACKGROUND

With continuous development of camera photography technologies of a mobile terminal, shooting photos or videos through the mobile terminal has become one of important functions of the mobile terminal.

SUMMARY

According to a first aspect, the embodiments of the present disclosure provide a shooting method, applied to a first terminal and including:

in a state in which a remote connection for sharing a shooting preview interface is established with a second terminal, receiving and displaying a first preview interface of the second terminal sent by the second terminal;

receiving a first input performed by a user; and outputting first target shooting data in response to the first input, where the first target shooting data includes partial or all image information of the first preview interface, and the first target shooting data is a video or an image.

According to a second aspect, the embodiments of the present disclosure further provide a shooting method, applied to a second terminal and including:

in a state in which a remote connection for sharing a shooting preview interface is established with a first terminal, sending a first preview interface of the second terminal to the first terminal; and receiving and displaying a second preview interface of the first terminal sent by the first terminal.

According to a third aspect, the embodiments of the present invention further provide a terminal. The terminal is a first terminal in the first terminal and a second terminal that establish a remote connection for sharing a shooting preview interface includes:

a processing module, configured to receive and display a first preview interface of the second terminal sent by the second terminal;

a first receiving module, configured to receive a first input performed by a user; and an outputting module, configured to output first target shooting data in response to the first input, where the first target shooting data includes partial or all image information of the first preview interface, and the first target shooting data is a video or an image.

According to a fourth aspect, the embodiments of the present invention further provide a terminal. The terminal is a second terminal in a first terminal and the second terminal that establish a remote connection for sharing a shooting preview interface, and includes:

a third sending module, configured to send a first preview interface of the second terminal to the first terminal; and a seventh receiving module, configured to receive and display a second preview interface of the first terminal sent by the first terminal.

According to a fifth aspect, the embodiments of the present disclosure further provide another terminal, including a processor, a memory, a computer program that is stored in the memory and that can run on the processor, and when the computer program is executed by the processor, the steps of the above shooting method are implemented.

According to a sixth aspect, the embodiments of the present disclosure further provide a non-transitory computer-readable storage medium, where the non-transitory computer-readable storage medium stores a computer program, and when the computer program is executed by a processor, the steps of the above shooting method are implemented.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

In a shooting manner in the prior art, a shooting control on the mobile terminal usually needs to be clicked for shooting control, or shooting control is performed with the help of external tools such as a selfie stick. This shooting manner is limited by a distance between the mobile terminal and a photographer, and consequently remote shooting control cannot be implemented.

Figure 1:
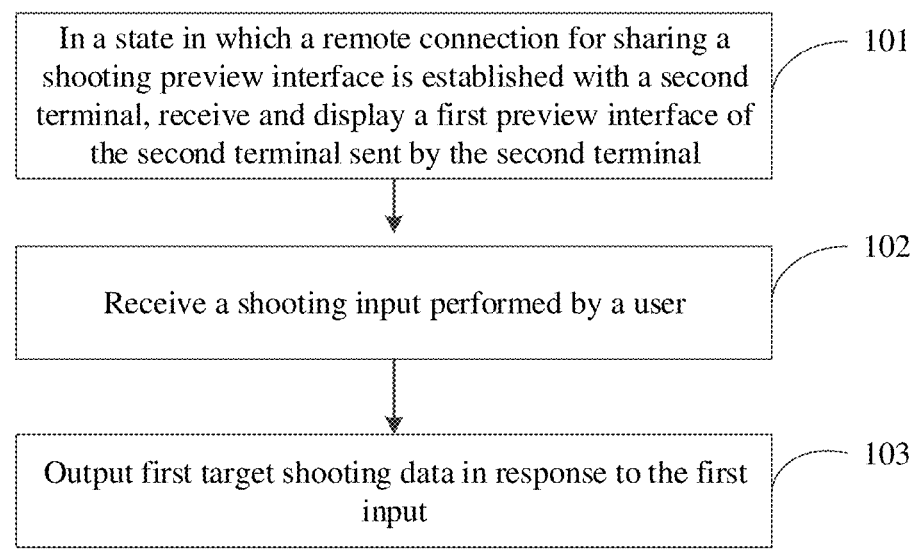
FIG. 1 is a flowchart of a shooting method according to an embodiment of the present disclosure.

Referring to FIG. 1, FIG. 1 is a flowchart of a shooting method according to an embodiment of the present invention. The shooting method is applied to a first terminal. As shown in FIG. 1, the shooting method includes the following steps.

Step 101: In a state in which a remote connection for sharing a shooting preview interface is established with a second terminal, receive and display a first preview interface of the second terminal sent by the second terminal.

In this embodiment of the present invention, a manner in which the first terminal and the second terminal establish a camera sharing connection through a network may be set based on actual needs. In an embodiment, a camera sharing connection may be established to the second terminal by using a camera application. For example, a sharing control is provided on an interface of the camera application, the shared second terminal is added by clicking the sharing control, and a sharing request is sent to the second terminal, to implement camera sharing. In another embodiment, camera sharing may be performed through a social platform. For example, a camera sharing control is provided on a chat interface of the social platform, and the camera sharing control is clicked to enable a user to establish a camera sharing connection with the second terminal corresponding to at least one contact in the social platform. In an optional embodiment, if there is currently a single-person chat interface, a camera sharing connection may be established with a terminal corresponding to a contact on the chat interface; or if there is currently a group chat interface, a camera sharing connection may be established with a terminal corresponding to at least one contact in the group. In other words, the first terminal may establish a camera sharing connection with one or more second terminals.

Figure 2:
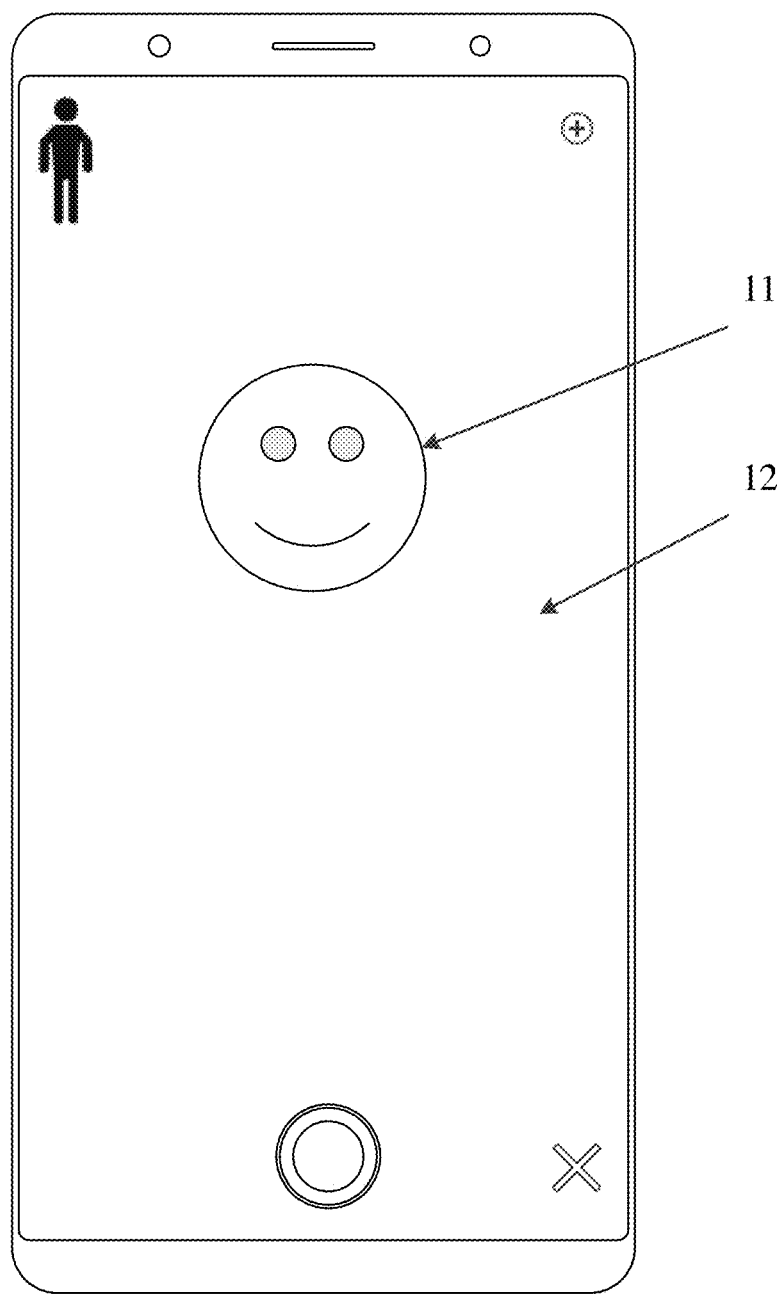
FIG. 2 is a first schematic diagram of a display interface according to an embodiment of the present disclosure.
Figure 3:
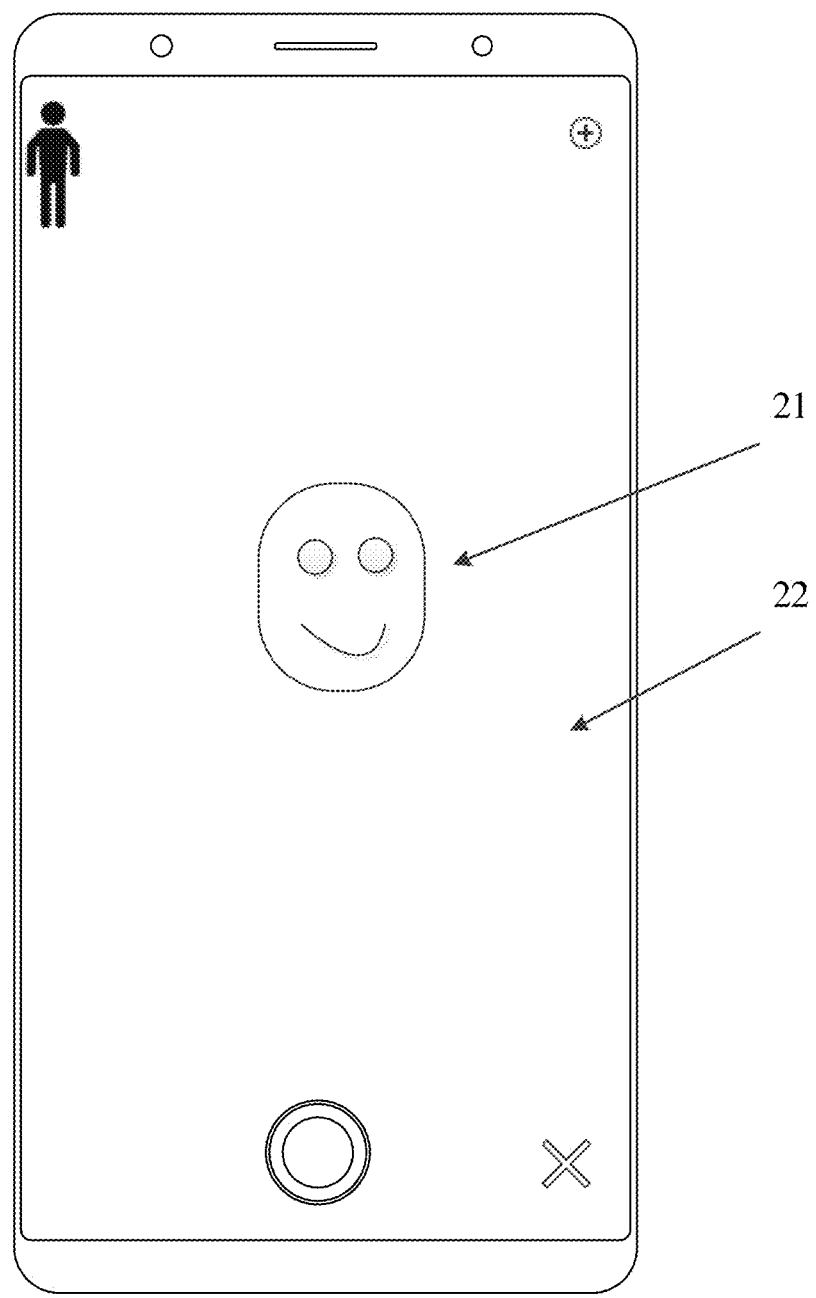
FIG. 3 is a second schematic diagram of a display interface according to an embodiment of the present disclosure.
Figure 4:
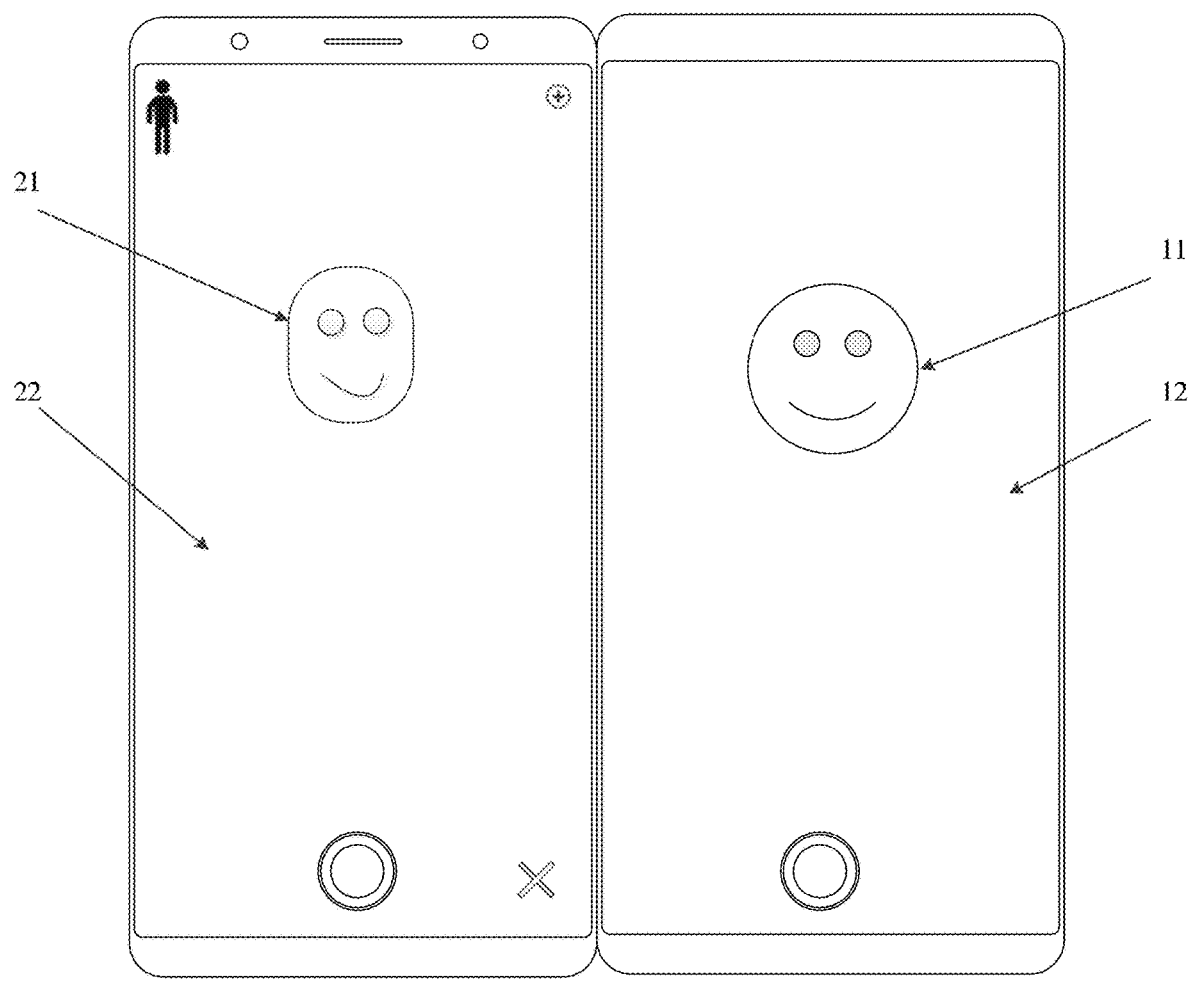
FIG. 4 is a third schematic diagram of a display interface according to an embodiment of the present disclosure.
Figure 5:
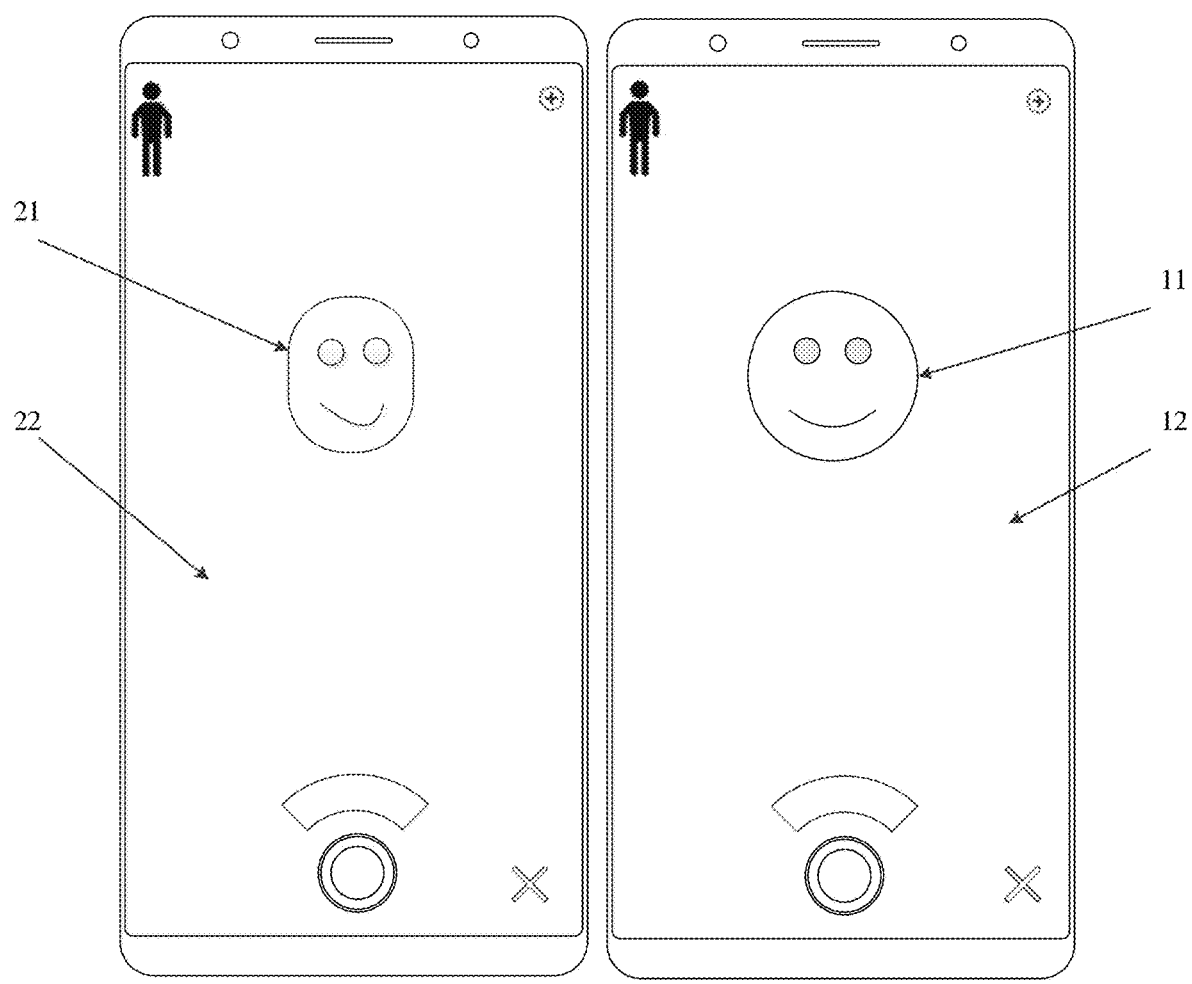
FIG. 5 is a fourth schematic diagram of a display interface according to an embodiment of the present disclosure.

After the first terminal establishes the camera sharing connection with the second terminal, the first terminal may obtain and display, in real time, the first preview interface collected by the second terminal. It should be understood that, in this embodiment, the first terminal has a camera, and the first terminal may obtain and display a second preview interface collected by the camera of the first terminal. For example, a manner in which the first terminal displays the first preview interface and the second preview interface may be as shown in FIG. 2 to FIG. 6. When the first terminal is a single-screen terminal, as shown in FIG. 2, the first terminal may display a first preview interface, where the first preview interface 10 includes a first portrait picture 11 and a first background 12. After receiving a switching command, the first terminal may display a second preview interface. As shown in FIG. 3, the second preview interface 20 includes a second portrait picture 21 and a second background 22. When the first terminal is a folding-screen terminal, as shown in FIG. 4, the first preview interface 10 may be displayed on one screen, and the second preview interface 20 may be displayed on the other screen. When the first terminal is a multi-screen terminal, as shown in FIG. 5, the first preview interface 10 may be displayed on one screen, and the second preview interface 20 may be displayed on another screen.

Step 102: Receive a first input performed by the user.

In this embodiment, the first input is used to control the first terminal to shoot a video or shoot a photo, and the user may perform the first input through a shooting button, a voice, or a gesture. This is not further limited herein.

Step 103: Output first target shooting data in response to the first input.

The first target shooting data includes partial or all image information of the first preview interface, and the first target shooting data is a video or an image.

In this embodiment, in response to the first input, the first terminal may directly perform video recording or shooting processing on the partial or all image information of the first preview interface, and may output the first target shooting data. The first target shooting data may be stored in a cache of the first terminal, and is saved locally through a save operation performed by the user; or may be directly saved locally. In addition, the first terminal may further output a shooting instruction to the second terminal to control a camera of the second terminal to perform a shooting action and update the first preview interface of the first terminal in real time. When a shooting condition is met, the first terminal may perform video recording or shooting processing on the partial or all the image information of the current first preview interface. The second terminal may locally save shooting data generated by the current shooting action, and the shooting data may be saved locally.

It should be noted that the first target shooting data may include the partial or all image information of the first preview interface. When the first target shooting data includes all image information of the first preview interface, an image captured by the second terminal is captured by the first terminal. When the first target shooting data includes the part of the image information of the first preview interface, an image obtained after the first preview interface and the second preview interface are spliced and synthesized is shot. Details are provided below.

In some embodiments, before step 102, the method further includes:

displaying a target preview interface.

The target preview interface is an interface obtained by synthesizing image data of the first preview interface with image data of the second preview interface, and the second preview interface is a preview interface collected by a camera of the first terminal. The first target shooting data is all image data of the target preview interface.

In this embodiment, the target preview interface may include partial image data of the first preview interface and partial image data of the second preview interface. For example, the first preview interface may include the first portrait picture 11 and the first background 12, and the second preview interface may include the second portrait picture 21 and the second background 22. The target preview interface includes but is not limited to any of the following manners:

Manner 1: The second portrait picture 21 and the first background 12.

Manner 2: The first portrait picture 11, the second portrait picture 21, and the first background 12.

Manner 3: The first portrait picture 11, the second portrait picture 21, and the second background 22.

Manner 4: The first portrait picture 11, the second portrait picture 21, a part of the first background 12, and a part of the second background 22.

In this embodiment, the first preview interface and the second preview interface may be spliced and synthesized into a target preview interface, and then shooting processing is performed on the target preview interface to obtain the first target shooting data. In this way, shooting flexibility is improved.

In some embodiments, a background in the target preview interface may be further updated. Optionally, after the displaying a target preview interface, the method further includes:

receiving a second input performed by the user; and updating a background of a target region in the target preview interface in response to the second input, where the updated background of the target region includes partial or all of a background in the first preview interface, or includes partial or all of a background in the second preview interface; and the target region is a display region of the image data of the first preview interface or a display region of the image data of the second preview interface.

It should be noted that the updating a background of a target region in the target preview interface means performing switching on the background of the target region. For example, the background in the target preview interface may be set to a first background 12, or may be set to a second background 22. In this embodiment, the background of the target region may be switched through the first input. For example, the first background 12 may be switched to the second background 22, or the second background 22 may be switched to the first background 12. The background of the target region may be switched, thereby further improving shooting flexibility.

To better understand the present disclosure, the background updating solution is described in detail for the foregoing manner 1 to manner 4.

Figure 6:
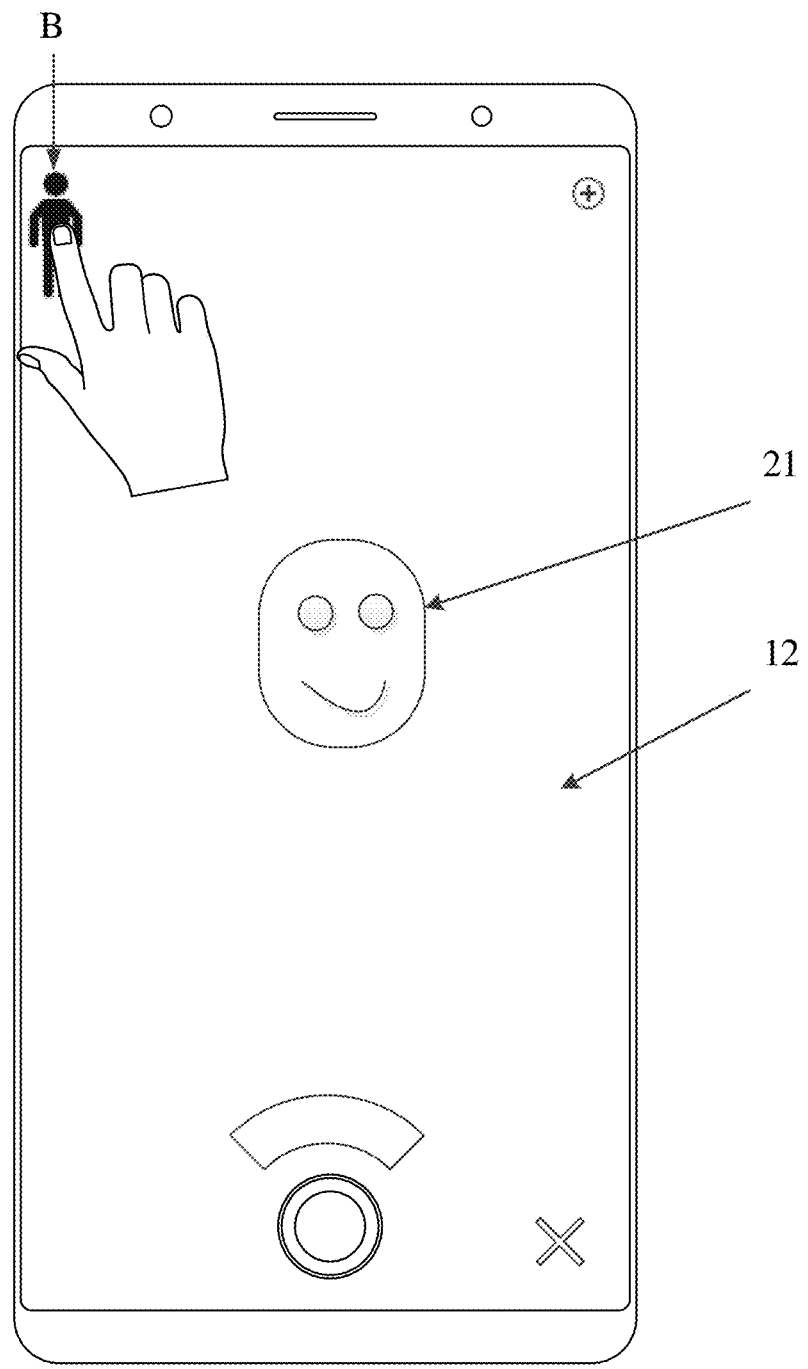
FIG. 6 is a fifth schematic diagram of a display interface according to an embodiment of the present disclosure.
Figure 7:
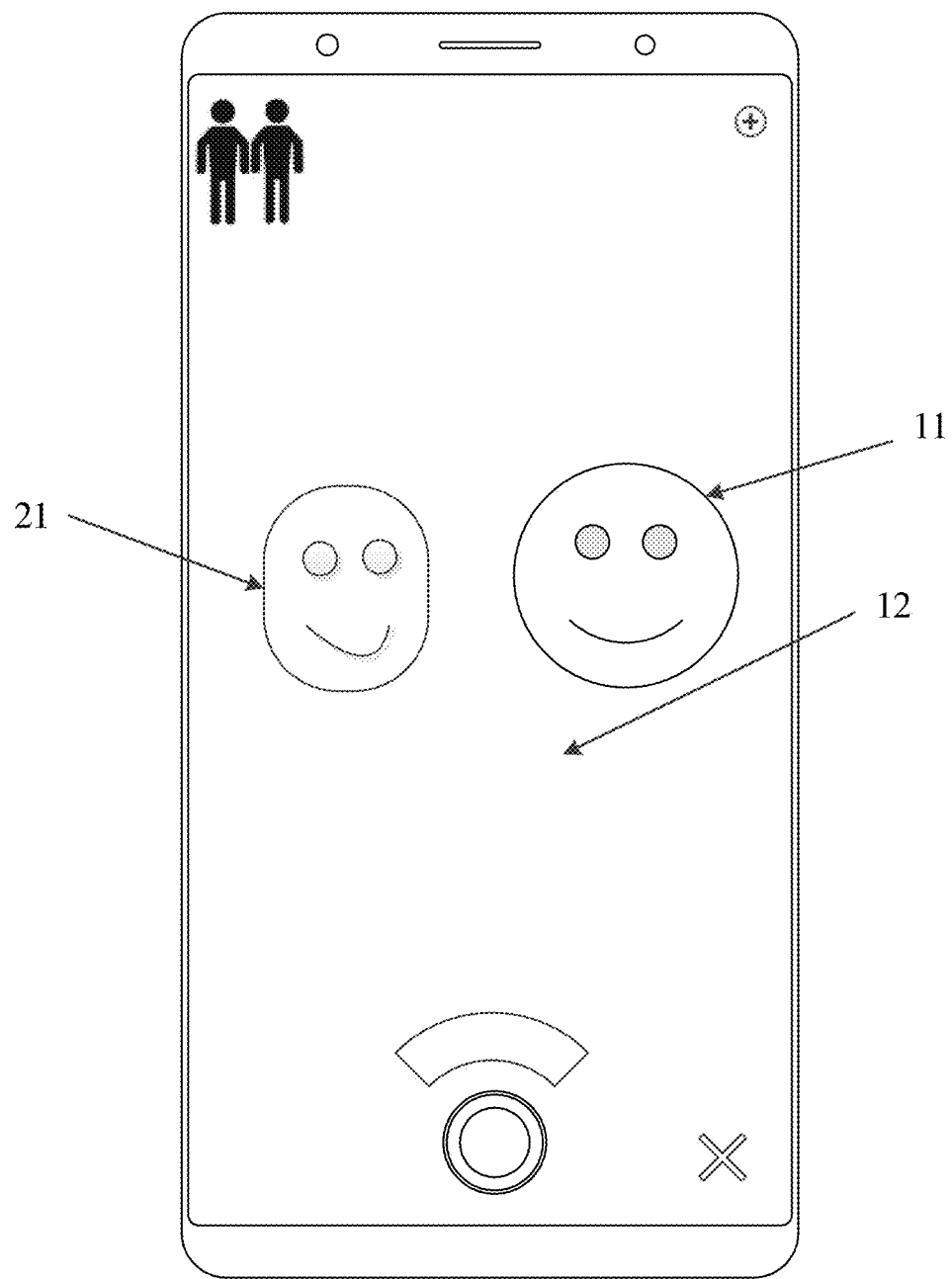
FIG. 7 is a sixth schematic diagram of a display interface according to an embodiment of the present disclosure.
Figure 8:
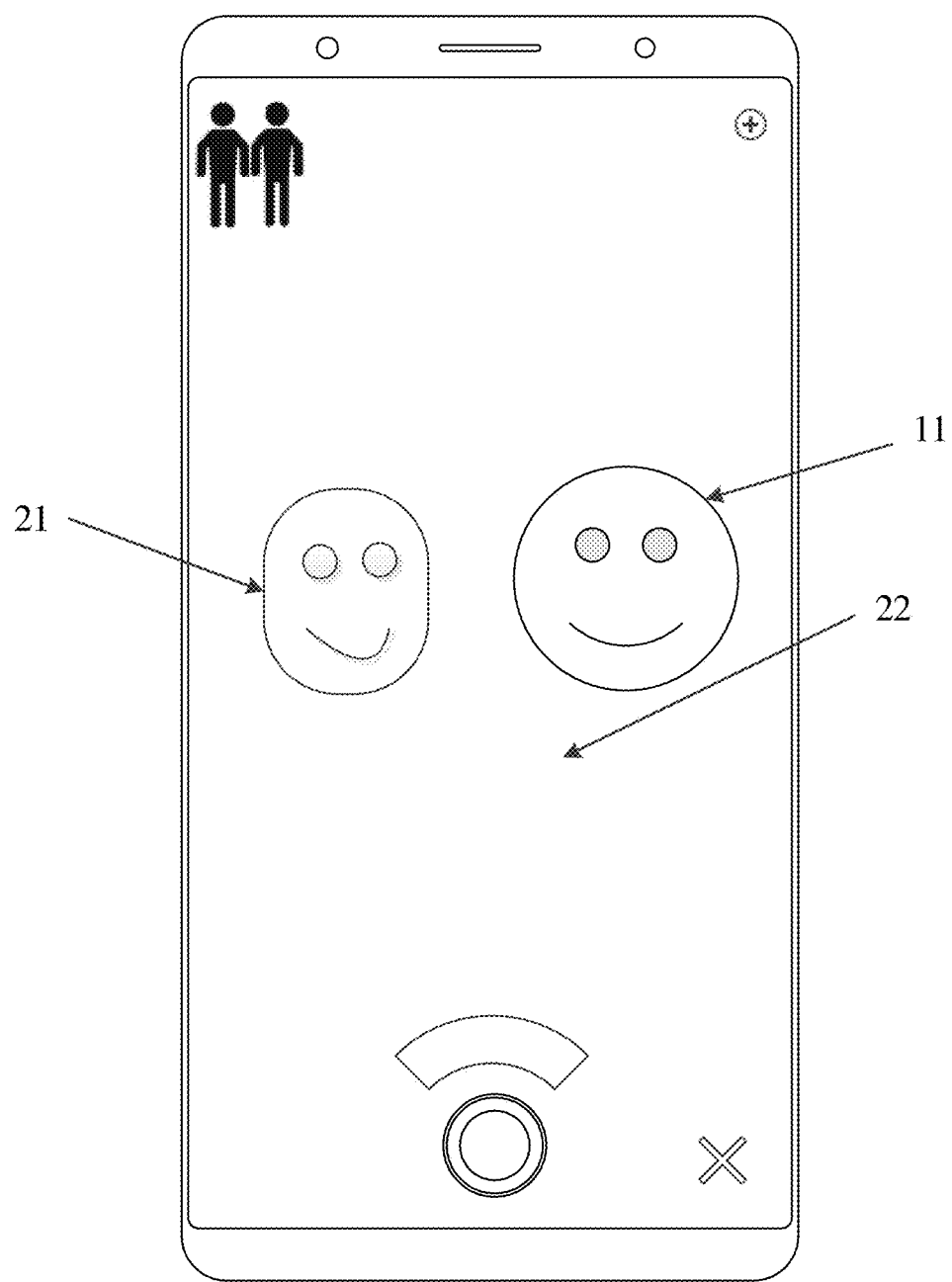
FIG. 8 is a seventh schematic diagram of a display interface according to an embodiment of the present disclosure.

For example, in an embodiment, a single-person shooting mode is used by default. As shown in FIG. 6, the target preview interface includes a second portrait picture 21 and a first background 12. The user may click the shooting mode to switch to a group photo shooting mode (for example, click a control B in an upper left corner of the figure), to display a target preview interface shown in FIG. 7. In this case, the target region is an entire display interface. The user may update a display interface of the target region through the second input. For example, in a state shown in FIG. 7, the user may click the first background 12, to switch the background to a second background 21. In this case, a target preview interface shown in FIG. 8 is displayed.

In this embodiment, the foregoing input manner of the second input may be set based on an actual situation. For example, the target region may be directly clicked, or an operation control may be set, or the second input is implemented in a manner such as an operation gesture.

In some embodiments, the target preview interface may further include a segmentation line for distinguishing the image data of the first preview interface from the image data of the second preview interface, and the target preview interface is segmented into a first preview sub-region and a second preview sub-region by the segmentation line; and after the displaying a target preview interface, the method further includes:

receiving a third input performed by the user for the segmentation line; and updating a display area of the image data of the first preview sub-region and a display area of the image data of the second preview sub-region in response to the third input.

Figure 9:
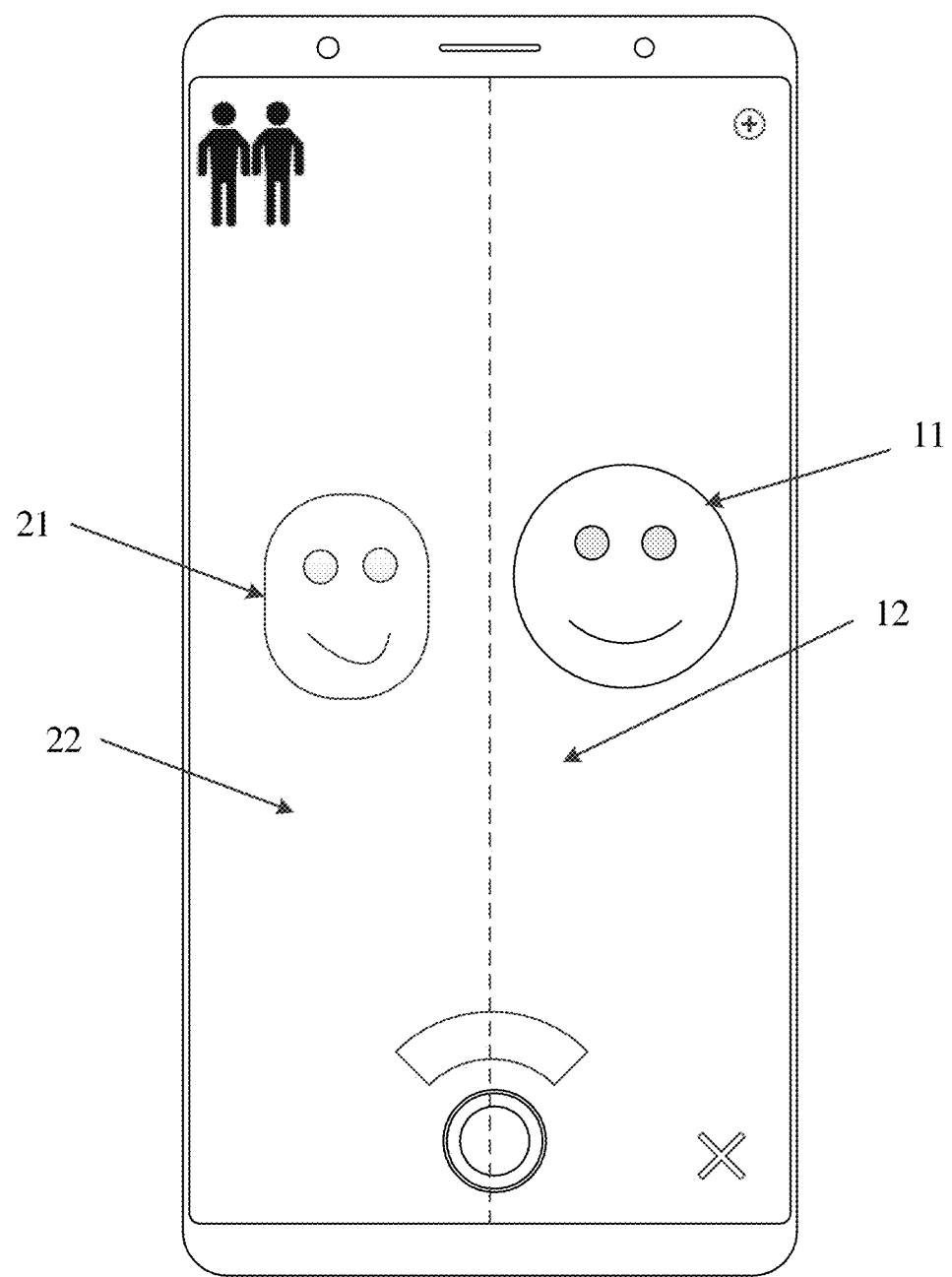
FIG. 9 is an eighth schematic diagram of a display interface according to an embodiment of the present disclosure.
Figure 10:
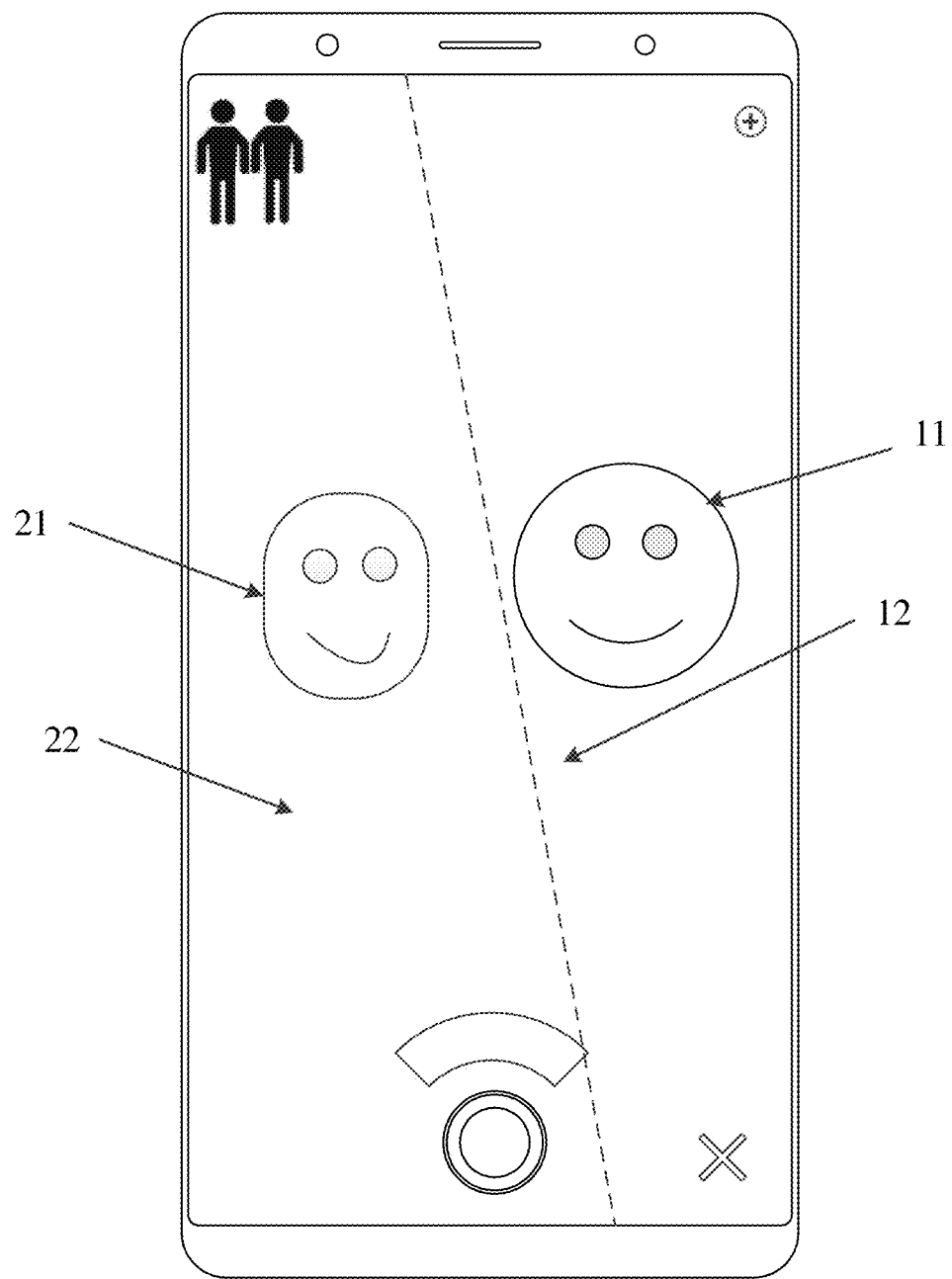
FIG. 10 is a ninth schematic diagram of a display interface according to an embodiment of the present disclosure.

As shown in FIG. 9, the segmentation line is a dashed line shown in FIG. 9. In a default state, the segmentation line is located in the middle of a screen, and the target preview interface is segmented into the first preview sub-region and the second preview sub-region with an equal area in a width direction. The user may adjust a position of a first segmentation line through a drag operation, to adjust an area of the image data of the first preview sub-region and an area of the image data of the second preview sub-region. For example, the adjusted target preview interface is shown in FIG. 10. In this way, different segmentation manners may be set based on different preferences of the user, so that the background segmentation manner is more flexible.

It should be noted that there may be one or more second terminals. For example, in this embodiment, there are at least two second terminals. The first terminal may include a first screen and a second screen, and before the displaying a preview interface of the second terminal, the method further includes:

displaying at least two preview interfaces of the second terminal on the first screen; and the displaying a preview interface of the second terminal includes:

receiving a fourth which/that is performed on the at least two preview interfaces of the second terminal by the user; and in response to the fourth input, displaying the first preview interface that is of the second terminal and that is selected by the fourth input.

Figure 11:
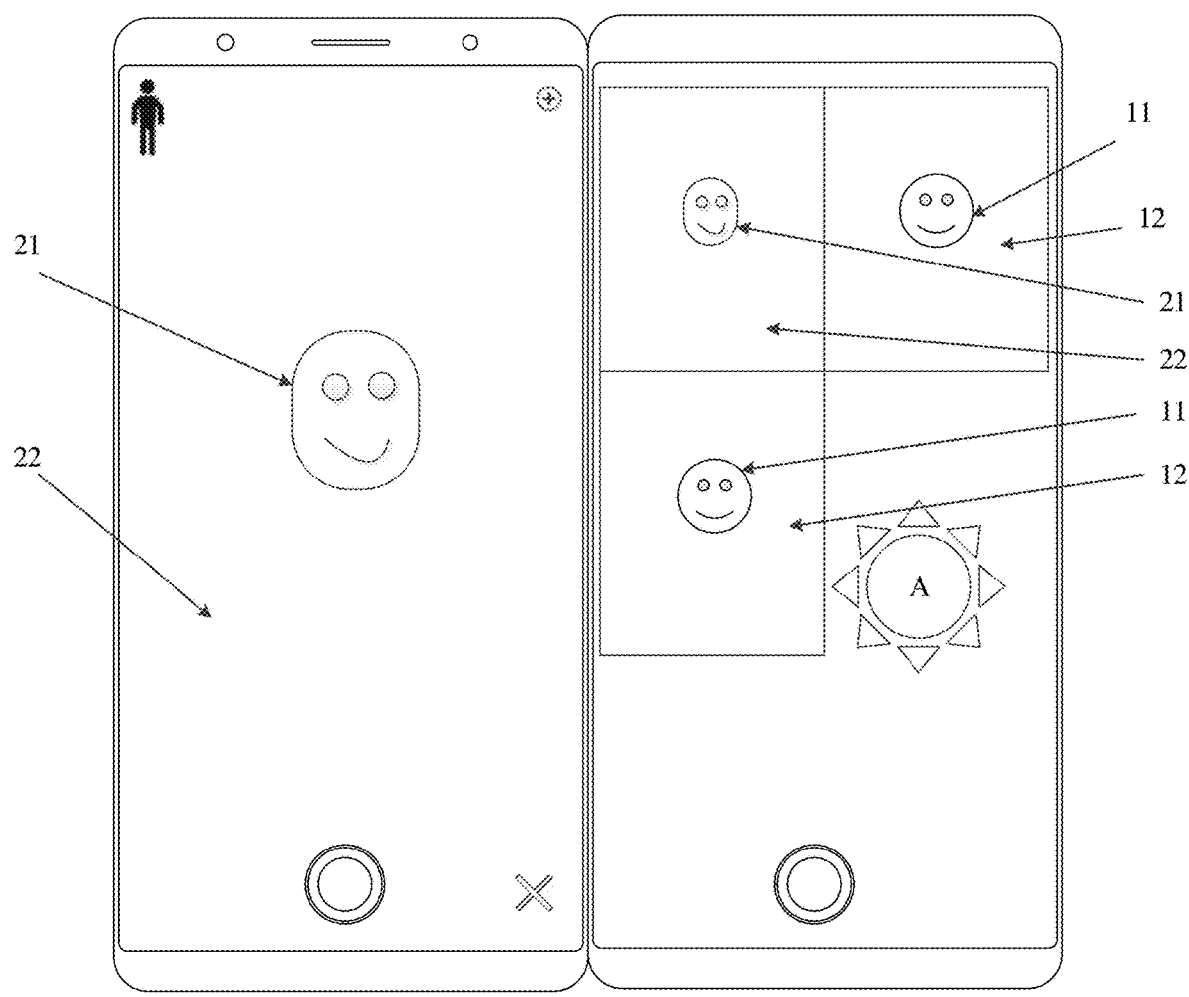
FIG. 11 is a tenth schematic diagram of a display interface according to an embodiment of the present disclosure.

In this embodiment, the user of the first terminal may directly establish, by using social software, remote connections for sharing shooting preview interfaces with a plurality of second terminals. Through the establishing of the connection, preview interfaces of all second terminals may be displayed on the first screen. As shown in FIG. 11, the first screen may display preview interfaces of all the second terminals and the first preview interface. The fourth input may be a touch input on the preview interface of the second terminal. When the user needs to use a preview interface as the first preview interface for display, the user may directly click the corresponding preview interface. In addition, a switching control A may be further displayed on the first screen, and switching of the first preview interface is implemented by using the switching control A. In this embodiment, the preview interfaces of the at least two second terminals are displayed on the first screen, and the first preview interface may be selected by the fourth input. In this way, a plurality of terminals can simultaneously share a shooting preview interface, thereby facilitating the user's operation.

In an optional embodiment, after each second terminal is shot, the shot data may be spliced. For example, in this embodiment, after the displaying at least two preview interfaces of the second terminal on the first screen, the method further includes:

receiving N times of fifth inputs performed by the user on preview interfaces of N second terminals;

respectively displaying the preview interfaces of the N second terminals in response to the N times of fifth inputs;

obtaining N pieces of shooting data generated based on the preview interfaces of the N second terminals; and splicing the N pieces of shooting data to generate second target shooting data.

In this embodiment, the fifth input may be an input for a touch operation performed on the preview interface of the second terminal. N is an integer greater than 1. Optionally, a value of N may be preset, for example, may be 2 or 4. That is, after the user performs a fixed quantity of times of fifth inputs, the preview interfaces of the N second terminals are respectively displayed on the second screen in response to the N times of fifth inputs. In addition, N may not be fixed. For example, after the fifth input is performed for the M-th time, timing may be started to determine whether there is a fifth input in a preset time period. If the fifth input is received, timing is performed again. If the fifth input is not received, M is determined as N, and the N times of fifth inputs are responded. In another embodiment, N may be a quantity of times of receiving the fifth input in the preset time period.

The fifth input may be a touch input to the second terminal, for example, may be an operation of clicking on the preview interface of the second terminal. A display manner of the preview interface of the second terminal may be set based on an actual situation. For example, in an embodiment, a currently clicked preview interface of the second terminal may be displayed after a fifth input is performed each time, and after the fifth input is displayed for the i-th time, the preview interface of the second terminal corresponding to the i-th time of the fifth input may be shot to obtain the i-th piece of shooting data. Optionally, in this embodiment, the obtaining N pieces of shooting data generated based on the preview interfaces of the N second terminals includes:

receiving a sixth input performed by the user in a case that the i-th time of fifth input performed by the user for the i-th second terminal is received and a preview interface of the i-th second terminal is displayed; and in response to the sixth input, performing a shooting operation to generate the i-th piece of shooting data, where the i-th piece of shooting data is an image or a video, i is a positive integer, and i is less than or equal to N.

In this embodiment, the sixth input is used to control the first terminal to shoot a video or shoot a photo, and the user may perform the sixth input through a shooting button, a voice, or a gesture. This is not further limited herein. In this embodiment, after the fifth input is performed each time, the preview interface of the second terminal is shot by the sixth input, thereby improving shooting pertinence and ensuring a shooting effect.

It should be noted that, in another embodiment, the display and the shooting process of the preview interface of the second terminal may be implemented in another manner. For example, each time the user clicks on the preview interface of the second terminal, display of one preview interface may be added to the second screen, and the added preview interface is the clicked preview interface of the second terminal. After the fifth input is performed N times, photo shooting or video shooting is performed on each preview interface to obtain the N pieces of shooting data. Alternatively, each preview interface of the second terminal displays preset duration, and then is switched to a next preview interface. In a process of displaying each preview interface, corresponding shooting data is generated to obtain the N pieces of shooting data. Finally, the N pieces of shooting data are spliced.

In this embodiment of the present disclosure, when a shooting preview interface is shared between the first terminal and a plurality of second terminals, a preview interface of a user A (the user of the second terminal) may be shot to obtain a first photo and a preview interface of a user B (the user of the second terminal) may be shot to obtain a second photo, and then the two shot photos are spliced to obtain a final photo. Because shooting may be performed a plurality of times to obtain a plurality of pieces of shooting data, and the shooting data is spliced, operation is convenient so that any terminal can obtain an image obtained by combining shot images of a plurality of other terminals. In addition, the user may save only the second target shooting data, so that memory consumption can be reduced.

In this embodiment of the present disclosure, a shooting field of view of the second terminal may be adjusted by using the first terminal. Optionally, after step 101, the method further includes:

receiving a first touch input performed by the user;

obtaining a first input track of the first touch input;

generating a first shooting adjustment message based on the first input track; and sending the first shooting adjustment message to the second terminal, where the first shooting adjustment information is used by the second terminal to adjust a shooting field of view, and the first shooting adjustment message carries the first input track.

Figure 12:
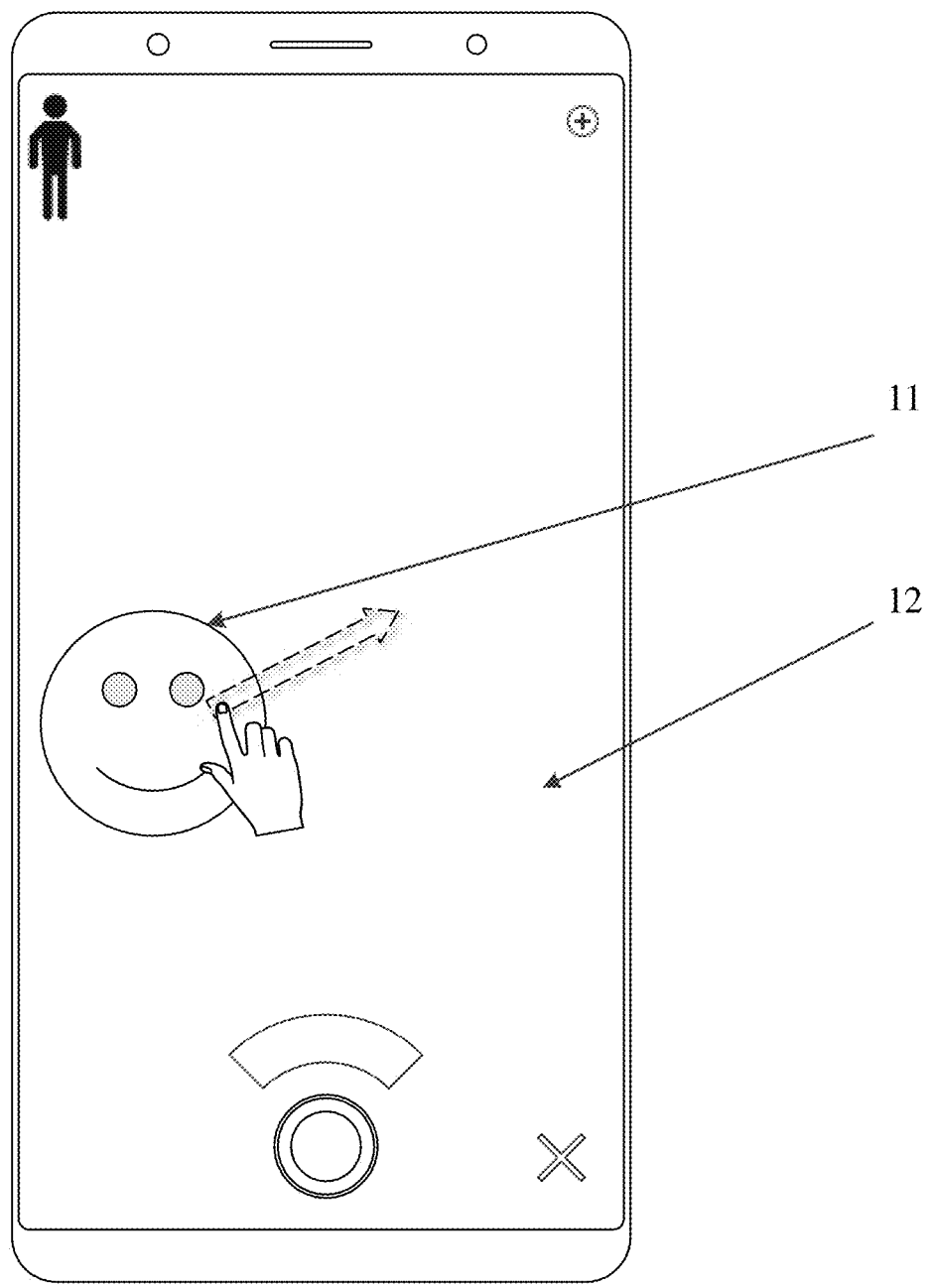
FIG. 12 is an eleventh schematic diagram of a display interface according to an embodiment of the present disclosure.

In this embodiment, the first touch input is a sliding input. Optionally, the user may perform the first touch input on the first preview interface, or may perform the first touch input on the second preview interface. The first input track may be an actual sliding track, or may be a straight line track from a start point to an end point. As shown in FIG. 12, when the user of the first terminal needs to adjust a shooting angle of the second terminal, the first touch input may be performed on the first terminal. The first terminal generates the first shooting adjustment message based on the first input track of the first touch input, and then sends the first shooting adjustment message to the second terminal.

Optionally, the second terminal first receives the first shooting adjustment message sent by the first terminal; then extracts the first input track from the first shooting adjustment message; and determines the target adjustment angle based on the first input track. The second terminal may perform different operations based on a size of an adjustment angle.

For example, in an embodiment, in a case that the target adjustment angle is less than or equal to a preset threshold, a position of a camera lens of the second terminal is adjusted based on the first input track.

In this embodiment, the camera lens may be mounted on a position adjustment component, and the position adjustment component may control the lens to move horizontally within a specific range. For example, the position adjustment component may be an optical anti-shake component (OIS), and a camera may be controlled to move horizontally by using the OIS to implement optical anti-shake. In this embodiment, the position of the lens may be adjusted by using the OIS to change a shooting angle. It should be noted that the OIS can only control the camera lens to move in a relatively small range. The preset threshold is related to a movement range of the camera lens controlled by the OIS. A specific size is not further described herein. In this embodiment, the user of the first terminal may implement remote control on the OIS by the second terminal through the first shooting adjustment message, to adjust the shooting angle of the second terminal, thereby automatically completing a shooting operation and simplifying shooting difficulty.

In another embodiment, in a case that the target adjustment angle is greater than the preset threshold, a first moving distance and a first moving direction of the second terminal are determined based on the target adjustment angle; and first prompt information is displayed, where the first prompt information is used to prompt a user of the second terminal to move the second terminal based on the first moving distance and the first moving direction.

In this embodiment, the prompt manner of the first prompt information may be set based on an actual requirement, for example, a prompt may be performed by using a text, or a moving direction may be indicated by using an arrow, and the first moving distance is prompted by using a text, for example, the first prompt information may be displayed in a form of a pop-up window. In addition, a language prompt may also be performed. The second terminal may further detect a current moving state by using a built-in sensor, and determine whether the user moves to a specified position, to improve moving accuracy.

In this embodiment, because the first shooting adjustment information may be sent by using the first terminal, movement of the second shooting terminal is alerted or a position of a camera is adjusted by controlling an OIS, so that shooting can be conveniently performed.

In some embodiments, in addition to adjusting the shooting field of view of the second terminal, the user of the first terminal may instruct the second terminal to move, to improve shooting pertinence. Optionally, in this embodiment, after step 101, the method may further include:

receiving a second touch input performed by the user;

obtaining a second input track of the second touch input;

generating a second shooting adjustment message based on the second input track; and sending the second shooting adjustment message to the second terminal, where the second shooting adjustment information is used by the second terminal to record a video or take a photo based on the second input track, and the second shooting adjustment message carries the second input track.

In this embodiment, the second touch input is a sliding input. Optionally, the user may perform the second touch input on the first preview interface, or may perform the second touch input on the second preview interface. The second input track may be an actual sliding track. Optionally, the second terminal first receives the second shooting adjustment message; then extracts the second input track from the second shooting adjustment message; determine the second moving direction and the second moving distance of the second terminal based on the second input track; and finally displays the second prompt information, where the second prompt information is used to instruct the second terminal user to move the second terminal based on the second moving distance and the second moving direction in a video recording or photo shooting process.

In this way, the user of the second terminal may move according to the second input track, and perform shooting or recording based on the second input track. For example, when shooting a building, the user of the second terminal may be instructed through the second track to move the second terminal from top to bottom, so as to implement shooting in a specified track. Optionally, for photo shooting, the user may be instructed by using the second track to take a photo at the top, take a photo in the middle, and finally take a photo at the bottom. For video recording, the user may be instructed by using the second track to perform video recording through a moving track. When the video recording starts, the camera is configured to shoot the top of the building, and then the second terminal is moved, so that a shooting interface gradually moves towards the bottom of the building. In this embodiment of the present disclosure, the first terminal sends the second shooting adjustment information to the second terminal, to indicate a moving distance and a moving direction to the second terminal. In this way, shooting pertinence and convenience can be improved. In addition, because there is no need to make a call in the process of shooting, impact on video shooting caused by talking of the user during video shooting is avoided.

In this embodiment of the present disclosure, in the state in which the remote connection for sharing the shooting preview interface is established with the second terminal, the first terminal receives and displays the first preview interface of the second terminal sent by the second terminal; receives the first input performed by the user; and outputs the first target shooting data in response to the first input, where the first target shooting data includes the partial or all image information of the first preview interface, and the first target shooting data is a video or an image. In this way, the first preview interface of the second terminal is displayed on the first terminal and shot on the first terminal, so that a remote shooting function can be implemented.

Figure 13:
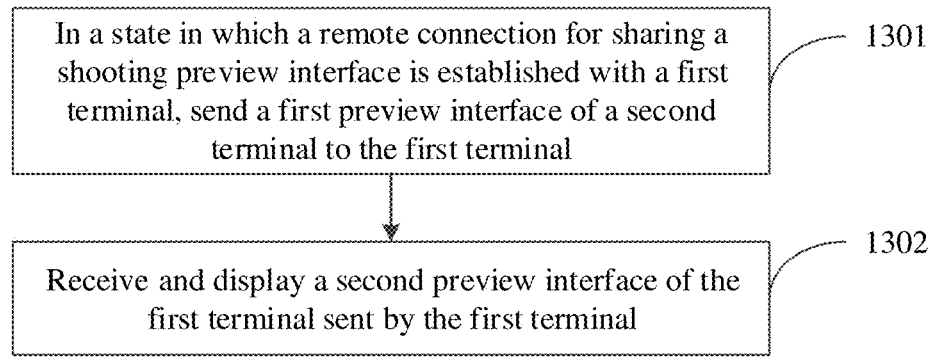
FIG. 13 is a flowchart of another shooting method according to an embodiment of the present disclosure.

Some embodiments of the present disclosure further provides a shooting method, applied to a second terminal. As shown in FIG. 13, the method includes the following steps.

Step 1301: In a state in which a remote connection for sharing a shooting preview interface is established with a first terminal, send a first preview interface of the second terminal to the first terminal.

Step 1302: Receive and display a second preview interface of the first terminal sent by the first terminal.

It should be noted that, when the first terminal performs shooting, a preview interface of the second terminal may be adjusted. Optionally, when adjustment needs to be performed, the first terminal may send first shooting adjustment information to the second terminal, where the first shooting adjustment information may carry a first input track input by a user on the preview interface of the second terminal. The second terminal may adjust a shooting field of view based on the first shooting adjustment information.

Optionally, in an embodiment, after the receiving and displaying a second preview interface of the first terminal sent by the first terminal, the method further includes:

receiving a first shooting adjustment message sent by the first terminal;

extracting a first input track from the first shooting adjustment message;

determining a target adjustment angle based on the first input track; and in a case that the target adjustment angle is less than or equal to a preset threshold, controlling an OIS of the second terminal to adjust a position of a camera lens of the second terminal based on the first input track.

In this embodiment, after receiving the first shooting adjustment message, the second terminal determines to adjust the target adjustment angle based on the first shooting adjustment information. When the target adjustment angle is relatively small, and the second terminal is equipped with a hardware device that can perform an OIS optical anti-shake function and adjust a small angle, automatic adjustment may be performed to the position, and then shooting is performed. If an adjustment angle is relatively large, manual adjustment is required.

Optionally, in another embodiment, after the extracting a first input track from the first shooting adjustment message, the method further includes:

in a case that the target adjustment angle is greater than the preset threshold, determining a first moving distance and a first moving direction of the second terminal based on the target adjustment angle; and displaying first prompt information, where the first prompt information is used to prompt a user of the second terminal to move the second terminal based on the first moving distance and the first moving direction.

In this embodiment, a user of the second terminal may move the second terminal based on the first prompt information to adjust a shooting angle to meet a shooting requirement of a user of the first terminal.

Optionally, after the receiving and displaying a second preview interface of the first terminal sent by the first terminal, the method further includes:

receiving a second shooting adjustment message sent by the first terminal;

extracting a second input track from the second shooting adjustment message;

determining a second moving direction and a second moving distance of the second terminal based on the second input track; and displaying second prompt information, where the second prompt information is used to prompt a user of the second terminal to move the second terminal based on the second moving distance and the second moving direction in a process of recording a video or taking a photo.

It should be noted that this embodiment is used as an implementation of the second terminal corresponding to the embodiment shown in FIG. 1. For a specific implementation of this embodiment, refer to the related descriptions of the embodiment shown in FIG. 2. A same beneficial effect can also be achieved. To avoid repeated descriptions, details are not described again herein.

Figure 14:
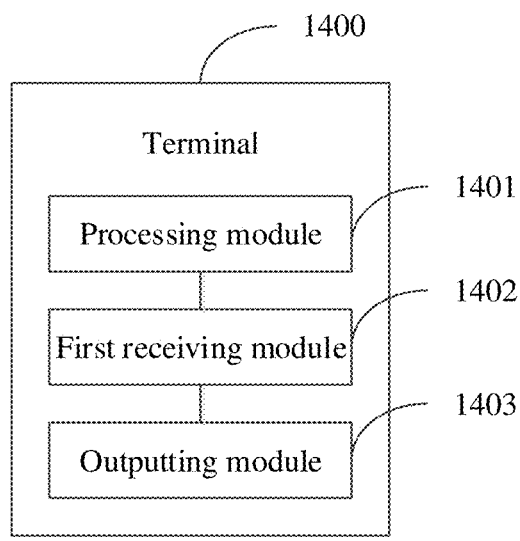
FIG. 14 is a structural diagram of a terminal according to an embodiment of the present disclosure.

Referring to FIG. 14, FIG. 14 is a structure diagram of a terminal according to an embodiment of the present disclosure. The terminal is a first terminal in the first terminal and a second terminal that establish a remote connection for sharing a shooting preview interface. As shown in FIG. 14, the terminal 1400 includes:

a processing module 1401, configured to receive and display a first preview interface of the second terminal sent by the second terminal;

a first receiving module 1402, configured to receive a first input performed by a user; and an outputting module 1403, configured to output first target shooting data in response to the first input, where the first target shooting data includes partial or all image information of the first preview interface, and the first target shooting data is a video or an image.

Optionally, the terminal 1400 further includes:

a first display module, configured to display a target preview interface, where the target preview interface is an interface obtained by synthesizing image data of the first preview interface with image data of a second preview interface, and the second preview interface is a preview interface collected by a camera of the first terminal; and the first target shooting data is all image data of the target preview interface.

Optionally, the terminal 1400 further includes:

a second receiving module, configured to receive a second input performed by the user; and a first updating module, configured to update a background of a target region in the target preview interface in response to the second input, where the updated background of the target region includes partial or all of a background in the first preview interface, or includes partial or all of a background in the second preview interface; and the target region is a display region of the image data of the first preview interface or a display region of the image data of the second preview interface.

Optionally, the target preview interface includes a segmentation line for distinguishing the image data of the first preview interface from the image data of the second preview interface, and the target preview interface is segmented into a first preview sub-region and a second preview sub-region by the segmentation line; and the terminal 1400 further includes:

a third receiving module, configured to receive a third input performed by the user for the segmentation line; and a second updating module, configured to update a display area of the image data of the first preview sub-region and a display area of the image data of the second preview sub-region in response to the third input.

Optionally, the terminal 1400 further includes:

a second display module, configured to display at least two preview interfaces of the second terminal on the first screen, where the processing module is specifically configured to: receive a fourth input performed by the user on the at least two preview interfaces of the second terminal; and in response to the fourth input, display the first preview interface that is of the second terminal and that is selected by using the fourth input.

Optionally, the terminal 1400 further includes:

a fourth receiving module, configured to receive N times of fifth inputs performed by the user on preview interfaces of N second terminals;

a third display module, configured to respectively display the preview interfaces of the N second terminals in response to the N times of fifth inputs;

a first obtaining module, configured to obtain N pieces of shooting data generated based on the preview interfaces of the N second terminals; and a splicing module, configured to splice the N pieces of shooting data to generate second target shooting data.

Optionally, the first obtaining module includes:

a display unit, configured to receive a sixth input performed by the user in a case that the i-th time of fifth input performed by the user for the i-th second terminal is received and a preview interface of the i-th second terminal is displayed; and a processing unit, configured to: in response to the sixth input, perform a shooting operation to generate the i-th piece of shooting data, where the i-th piece of shooting data is an image or a video, i is a positive integer, and i is less than or equal to N.

Optionally, the terminal 1400 further includes:

a fifth receiving module, configured to receive a first touch input performed by the user;

a second obtaining module, configured to obtain a first input track of the first touch input;

a first message generating module, configured to generate a first shooting adjustment message based on the first input track; and a first sending module, configured to send the first shooting adjustment message to the second terminal, where the first shooting adjustment information is used by the second terminal to adjust a shooting field of view, and the first shooting adjustment message carries the first input track.

Optionally, the terminal 1400 further includes:

a sixth receiving module, configured to receive a second touch input performed by the user;

a third obtaining module, configured to obtain a second input track of the second touch input;

a second message generating module, configured to generate a second shooting adjustment message based on the second input track; and a second sending module, configured to send the second shooting adjustment message to the second terminal, where the second shooting adjustment information is used by the second terminal to record a video or take a photo based on the second input track, and the second shooting adjustment message carries the second input track.

The terminal 1400 can implement each process implemented by the first terminal in the method embodiments in FIG. 1 to FIG. 12. To avoid repetition, details are not described herein again.

Figure 15:
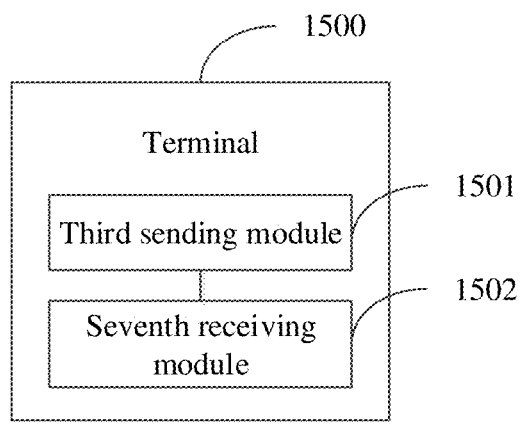
FIG. 15 is a structural diagram of another terminal according to an embodiment of the present disclosure.

Referring to FIG. 15, FIG. 15 is a structure diagram of a terminal according to an embodiment of the present disclosure. The terminal is a second terminal in a first terminal and the second terminal that establish a remote connection for sharing a shooting preview interface. As shown in FIG. 15, the terminal 1500 includes:

a third sending module 1501, configured to send a first preview interface of the second terminal to the first terminal; and a seventh receiving module 1502, configured to receive and display a second preview interface of the first terminal sent by the first terminal.

Optionally, the terminal 1500 further includes:

an eighth receiving module, configured to receive a first shooting adjustment message sent by the first terminal;

a first extracting module, configured to extract a first input track from the first shooting adjustment message;

a first determining module, configured to determine a target adjustment angle based on the first input track; and a first control module, configured to: in a case that the target adjustment angle is less than or equal to a preset threshold, control an OIS of the second terminal to adjust a position of a camera lens of the second terminal based on the first input track.

Optionally, the terminal 1500 further includes:

a second determining module, configured to: in a case that the target adjustment angle is greater than the preset threshold, determine a first moving distance and a first moving direction of the second terminal based on the target adjustment angle; and a fourth display module, configured to display first prompt information, where the first prompt information is used to prompt a user of the second terminal to move the second terminal based on the first moving distance and the first moving direction.

Optionally, the terminal 1500 further includes:

a ninth receiving module, configured to receive a second shooting adjustment message sent by the first terminal;

a second extracting module, configured to extract a second input track from the second shooting adjustment message;

a third determining module, configured to determine a second moving direction and a second moving distance of the second terminal based on the second input track; and a fifth display module, configured to display second prompt information, where the second prompt information is used to prompt a user of the second terminal to move the second terminal based on the second moving distance and the second moving direction in a process of recording a video or taking a photo.

The terminal 1500 can implement each process implemented by the second terminal in the method embodiment in FIG. 13. To avoid repetition, details are not described herein again.

Figure 16:
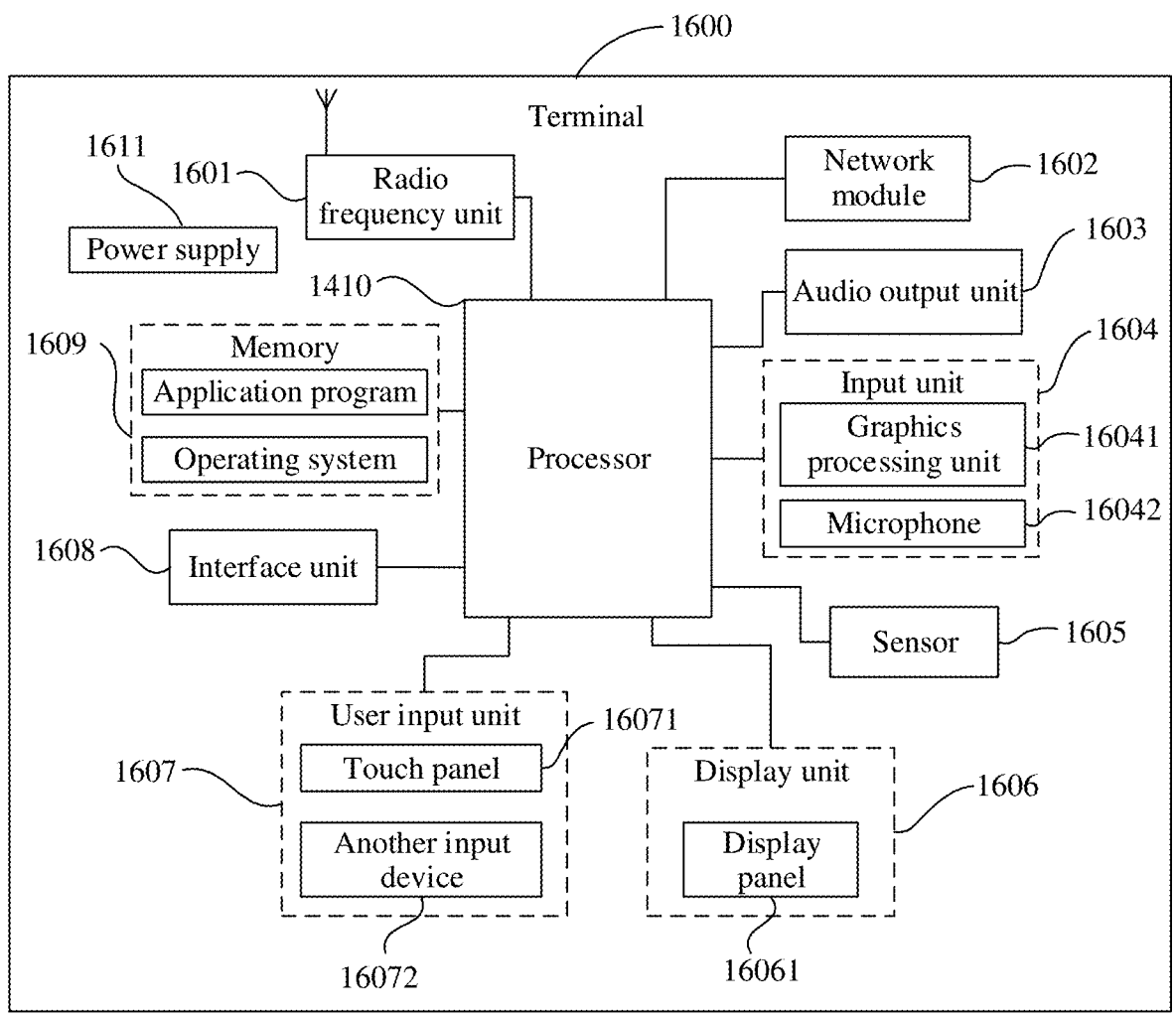
FIG. 16 is a structural diagram of another terminal according to an embodiment of the present disclosure.

FIG. 16 is a schematic structural diagram of hardware of a terminal according to the embodiments of the present disclosure. A terminal 1600 includes but is not limited to components such as a radio frequency unit 1601, a network module 1602, an audio output unit 1603, an input unit 1604, a sensor 1605, a display unit 1606, a user input unit 1607, an interface unit 1608, a memory 1609, a processor 1610, and a power supply 1611. A person skilled in the art can understand that the structure of the terminal shown in FIG. 16 does not constitute a limitation to the terminal. The terminal may include more or fewer components than that shown in the figure, or a combination of some components, or an arrangement of different components. In this embodiment of the present disclosure, the terminal includes but is not limited to a mobile phone, a tablet personal computer, a notebook computer, a palmtop computer, a vehicle-mounted terminal, a wearable device, a pedometer, or the like.

The processor 1610 is configured to: in a state in which a remote connection for sharing a shooting preview interface is established with a second terminal, receive and display a first preview interface of the second terminal sent by the second terminal;

receive a first input performed by a user; and output first target shooting data in response to the first input, where the first target shooting data includes partial or all image information of the first preview interface, and the first target shooting data is a video or an image.

Optionally, before the receiving a first input performed by a user, the processor 1610 is further configured to:

display a target preview interface, where the target preview interface is an interface obtained by synthesizing image data of the first preview interface with image data of a second preview interface, and the second preview interface is a preview interface collected by a camera of the first terminal; and the first target shooting data is all image data of the target preview interface.

Optionally, after the displaying a target preview interface, the processor 1610 is further configured to:

receive a second input performed by the user; and update a background of a target region in the target preview interface in response to the second input, where the updated background of the target region includes partial or all of a background in the first preview interface, or includes partial or all of a background in the second preview interface; and the target region is a display region of the image data of the first preview interface or a display region of the image data of the second preview interface.

Optionally, the target preview interface includes a segmentation line for distinguishing the image data of the first preview interface from the image data of the second preview interface, and the target preview interface is segmented into a first preview sub-region and a second preview sub-region by the segmentation line; and after the displaying a target preview interface, the processor 1610 is further configured to:

receive a third input performed by the user for the segmentation line; and update a display area of the image data of the first preview sub-region and a display area of the image data of the second preview sub-region in response to the third input.

Optionally, the first terminal includes a first screen and a second screen; and before the displaying a preview interface of the second terminal, the processor 1610 is further configured to:

display at least two preview interfaces of the second terminal on the first screen; and the displaying a preview interface of the second terminal includes:

receiving a fourth input performed by the user on the at least two preview interfaces of the second terminal; and in response to the fourth input, displaying the first preview interface that is of the second terminal and that is selected by using the fourth input.

Optionally, after the displaying at least two preview interfaces of the second terminal on the first screen, the processor 1610 is further configured to:

receive N times of fifth inputs performed by the user on preview interfaces of N second terminals;

respectively display the preview interfaces of the N second terminals in response to the N times of fifth inputs;

obtain N pieces of shooting data generated based on the preview interfaces of the N second terminals; and splice the N pieces of shooting data to generate second target shooting data.

Optionally, the processor 1610 is specifically configured to:

receive a sixth input performed by the user in a case that the i-th time of fifth input performed by the user for the i-th second terminal is received and a preview interface of the i-th second terminal is displayed; and in response to the sixth input, perform a shooting operation to generate the i-th piece of shooting data, where the i-th piece of shooting data is an image or a video, i is a positive integer, and i is less than or equal to N.

Optionally, after the receiving and displaying a first preview interface of the second terminal sent by the second terminal, the processor 1610 is further configured to: receive a first touch input performed by the user;

obtain a first input track of the first touch input;

generate a first shooting adjustment message based on the first input track; and send the first shooting adjustment message to the second terminal, where the first shooting adjustment information is used by the second terminal to adjust a shooting field of view, and the first shooting adjustment message carries the first input track.

Optionally, after the receiving and displaying a first preview interface of the second terminal sent by the second terminal, the processor 1610 is further configured to:

receive a second touch input performed by the user;

obtain a second input track of the second touch input;

generate a second shooting adjustment message based on the second input track; and send the second shooting adjustment message to the second terminal, where the second shooting adjustment information is used by the second terminal to record a video or take a photo based on the second input track, and the second shooting adjustment message carries the second input track.

In this embodiment of the present disclosure, in the state in which the remote connection for sharing the shooting preview interface is established with the second terminal, the first terminal receives and displays the first preview interface of the second terminal sent by the second terminal; receives the first input performed by the user; and outputs the first target shooting data in response to the first input, where the first target shooting data includes the partial or all image information of the first preview interface, and the first target shooting data is a video or an image. In this way, the first preview interface of the second terminal is displayed on the first terminal and shot on the first terminal, so that a remote shooting function can be implemented.

It should be understood that, in this embodiment of the present disclosure, the radio frequency unit 1601 may be configured to receive and send information or a signal in a call process. For example, after receiving downlink data from a base station, the radio frequency unit 1601 sends the downlink data to the processor 1610 for processing. In addition, the radio frequency unit 1601 sends uplink data to the base station. Generally, the radio frequency unit 1601 includes, but is not limited to, an antenna, at least one amplifier, a transceiver, a coupler, a low noise amplifier, a duplexer, and the like. In addition, the radio frequency unit 1601 can also communicate with another device through a wireless communications system and network.

The terminal provides wireless broadband Internet access for the user by using the network module 1602, for example, helping the user to send and receive an e-mail, browse a web page, and access streaming media.

The audio output unit 1603 may convert audio data received by the radio frequency unit 1601 or the network module 1602 or stored in the memory 1609 into an audio signal and output the audio signal as a sound. In addition, the audio output unit 1603 may further provide an audio output (for example, a call signal received voice, or a message received voice) related to a specific function implemented by the terminal 1600. The audio output unit 1603 includes a speaker, a buzzer, a telephone receiver, and the like.

The input unit 1604 is configured to receive an audio signal or a video signal. The input unit 1604 may include a graphics processing unit (GPU) 16041 and a microphone 16042, and the graphics processing unit 16041 processes image data of a still picture or video obtained by an image capture apparatus (such as a camera) in a video capture mode or an image capture mode. A processed image frame can be displayed on the display unit 1606. The image frame processed by the graphics processing unit 16041 may be stored in the memory 1609 (or another storage medium) or sent via the radio frequency unit 1601 or the network module 1602. The microphone 16042 can receive sound and can process such sound into audio data. Processed audio data can be converted, in telephone call mode, into a format that can be sent to a mobile communication base station via the radio frequency unit 1601 for output.

The terminal 1600 further includes at least one type of sensor 1605, such as a light sensor, a motion sensor, and another sensor. The light sensor includes an ambient light sensor and a proximity sensor. The ambient light sensor can adjust a brightness of a display panel 16061 based on a brightness of ambient light. The proximity sensor can close the display panel 16061 and/or backlight when the terminal 1600 moves to an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 1605 may further include a fingerprint sensor, a pressure sensor, an iris sensor, a molecular sensor, a gyroscope, a barometer, a hygrometer, a thermometer, an infrared sensor, and the like. Details are not described herein.

The display unit 1606 is configured to display information entered by a user or information provided for a user. The display unit 1606 may include a display panel 16061. The display panel 16061 may be configured in a form of a liquid crystal display (LCD), an organic light-emitting diode (OLED), or the like.

The user input unit 1607 may be configured to receive input numeral or character information, and generate key signal input related to user setting and functional control of the terminal. The user input unit 1607 includes a touch panel 16071 and another input device 16072. The touch panel 16071 is also referred to as a touchscreen, and may collect a touch operation performed by a user on or near the touch panel 16071 (such as an operation performed by a user on the touch panel 16071 or near the touch panel 16071 by using any proper object or accessory, such as a finger or a stylus). The touch panel 16071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 1610, and can receive and execute a command sent by the processor 1610. In addition, the touch panel 16071 can be implemented in various types such as resistive, capacitive, infrared, and surface acoustic wave. In addition to the touch panel 16071, the user input unit 1607 may further include the another input device 16072. The another input device 16072 may include but is not limited to at least one of a physical keyboard, a functional button (such as a volume control button or a power on/off button), a trackball, a mouse, or a joystick. Details are not described herein.

Further, the touch panel 16071 may cover the display panel 16061. When detecting the touch operation on or near the touch panel 16071, the touch panel 16071 transmits the touch operation to the processor 1610 to determine a type of a touch event, and then the processor 1610 provides corresponding visual output on the display panel 16061 based on the type of the touch event. Although in FIG. 16, the touch panel 16071 and the display panel 16061 are configured as two independent components to implement input and output functions of the terminal, in some embodiments, the touch panel 16071 and the display panel 16061 can be integrated to implement the input and output functions of the terminal. Details are not limited herein.

The interface unit 1608 is an interface for connecting an external apparatus to the terminal 1600. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 1608 can be configured to receive input (for example, data information and power) from the external apparatus and transmit the received input to one or more elements in the terminal 1600, or transmit data between the terminal 1600 and the external apparatus.

The memory 1609 can be configured to store software programs and various data. The memory 1609 may mainly include a program storage area and a data storage area. The program storage area may store an operating system, an application program required by at least one function (such as a voice playing function and an image playing function), and the like, and the data storage area may store data (such as audio data and a phone book) created based on use of the mobile phone, and the like. In addition, the memory 1609 may include a high-speed random access memory or a nonvolatile memory, for example, at least one disk storage device, a flash memory, or another volatile solid-state storage device.

The processor 1610 is a control center of the terminal, and connects all parts of the entire terminal by using various interfaces and lines. By running or executing a software program and/or a module stored in the memory 1609 and invoking data stored in the memory 1609, the processor 1610 performs various functions of the terminal and data processing, to perform overall monitoring on the terminal. The processor 1610 may include one or more processing units. Optionally, the processor 1610 may be integrated with an application processor and a modem processor. The application processor mainly processes an operating system, a user interface, an application program, and the like, and the modem processor mainly processes wireless communication. It can be understood that the foregoing modem processor may not be integrated into the processor 1610.

The terminal 1600 may further include the power supply 1611 (such as a battery) that supplies power to each component. Optionally, the power supply 1611 may be logically connected to the processor 1610 by using a power management system, so as to implement functions such as charging, discharging, and power consumption management by using the power management system.

In addition, the terminal 1600 includes some function modules not shown, and details are not described herein.

Optionally, an embodiment of the present disclosure further provides a terminal, including a processor 1610, a memory 1609, and a computer program that is stored in the memory 1609 and that can run on the processor 1610. When executing the computer program, the processor 1610 implements the foregoing processes of the shooting method embodiment and a same technical effect can be achieved. To avoid repetition, details are not described herein again.

Figure 17:
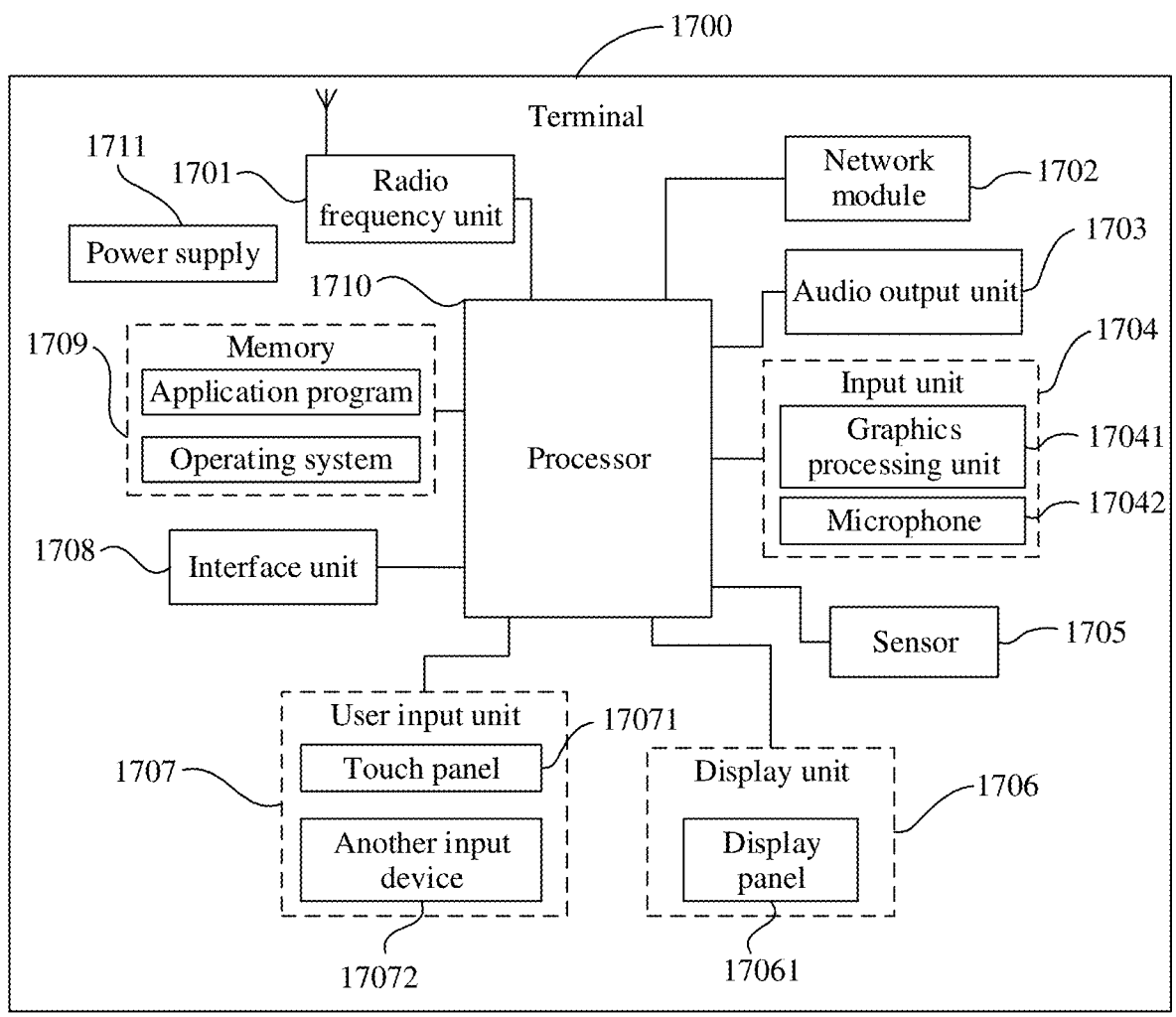
FIG. 17 is a structural diagram of another terminal according to an embodiment of the present disclosure.

FIG. 17 is a schematic structural diagram of hardware of a terminal according to the embodiments of the present disclosure. A terminal 1700 includes but is not limited to components such as a radio frequency unit 1701, a network module 1702, an audio output unit 1703, an input unit 1704, a sensor 1705, a display unit 1706, a user input unit 1707, an interface unit 1708, a memory 1709, a processor 1710, and a power supply 1711. A person skilled in the art can understand that the structure of the terminal shown in FIG. 17 does not constitute a limitation to the terminal. The terminal may include more or fewer components than that shown in the figure, or a combination of some components, or an arrangement of different components. In this embodiment of the present disclosure, the terminal includes but is not limited to a mobile phone, a tablet personal computer, a notebook computer, a palmtop computer, a vehicle-mounted terminal, a wearable device, a pedometer, or the like.

The processor 1710 is configured to: in a state in which a remote connection for sharing a shooting preview interface is established with a first terminal, send a first preview interface of the second terminal to the first terminal; and receive and display a second preview interface of the first terminal sent by the first terminal.

Optionally, after the receiving and displaying a second preview interface of the first terminal sent by the first terminal, the processor 1710 is further configured to:

receive a first shooting adjustment message sent by the first terminal;

extract a first input track from the first shooting adjustment message;

determine a target adjustment angle based on the first input track; and in a case that the target adjustment angle is less than or equal to a preset threshold, control an OIS of the second terminal to adjust a position of a camera lens of the second terminal based on the first input track.

Optionally, after the extracting a first input track from the first shooting adjustment message, the processor 1710 is further configured to:

in a case that the target adjustment angle is greater than the preset threshold, determine a first moving distance and a first moving direction of the second terminal based on the target adjustment angle; and display first prompt information, where the first prompt information is used to prompt a user of the second terminal to move the second terminal based on the first moving distance and the first moving direction.

Optionally, after the receiving and displaying a second preview interface of the first terminal sent by the first terminal, the processor 1710 is further configured to:

receive a second shooting adjustment message sent by the first terminal;

extract a second input track from the second shooting adjustment message;

determine a second moving direction and a second moving distance of the second terminal based on the second input track; and display second prompt information, where the second prompt information is used to prompt a user of the second terminal to move the second terminal based on the second moving distance and the second moving direction in a process of recording a video or taking a photo.

In this embodiment of the present disclosure, in the state in which the remote connection for sharing the shooting preview interface is established with the second terminal, the first terminal receives and displays the first preview interface of the second terminal sent by the second terminal; receives the first input performed by the user; and outputs the first target shooting data in response to the first input, where the first target shooting data includes the partial or all image information of the first preview interface, and the first target shooting data is a video or an image. In this way, the first preview interface of the second terminal is displayed on the first terminal and shot on the first terminal, so that a remote shooting function can be implemented.

It should be understood that, in this embodiment of the present disclosure, the radio frequency unit 1701 may be configured to receive and send information or a signal in a call process. For example, after receiving downlink data from a base station, the radio frequency unit 1701 sends the downlink data to the processor 1710 for processing. In addition, the radio frequency unit 1701 sends uplink data to the base station. Generally, the radio frequency unit 1701 includes, but is not limited to, an antenna, at least one amplifier, a transceiver, a coupler, a low noise amplifier, a duplexer, and the like. In addition, the radio frequency unit 1701 can also communicate with another device through a wireless communications system and network.

The terminal provides wireless broadband Internet access for the user by using the network module 1702, for example, helping the user to send and receive an e-mail, brows a web page, and access streaming media.

The audio output unit 1703 may convert audio data received by the radio frequency unit 1701 or the network module 1702 or stored in the memory 1709 into an audio signal and output the audio signal as a sound. In addition, the audio output unit 1703 may further provide an audio output (for example, a call signal received voice, or a message received voice) related to a specific function implemented by the terminal 1700. The audio output unit 1703 includes a speaker, a buzzer, a telephone receiver, and the like.

The input unit 1704 is configured to receive an audio signal or a video signal. The input unit 1704 may include a graphics processing unit (GPU) 17041 and a microphone 17042, and the graphics processing unit 17041 processes image data of a still picture or video obtained by an image capture apparatus (such as a camera) in a video capture mode or an image capture mode. A processed image frame can be displayed on the display unit 1706. The image frame processed by the graphics processing unit 17041 may be stored in the memory 1709 (or another storage medium) or sent via the radio frequency unit 1701 or the network module 1702. The microphone 17042 can receive sound and can process such sound into audio data. Processed audio data can be converted, in telephone call mode, into a format that can be sent to a mobile communication base station via the radio frequency unit 1701 for output.

The terminal 1700 further includes at least one type of sensor 1705, such as a light sensor, a motion sensor, and another sensor. The light sensor includes an ambient light sensor and a proximity sensor, where the ambient light sensor can adjust brightness of a display panel 17061 based on brightness of ambient light, and the proximity sensor can turn off the display panel 17061 and/or backlight when the terminal 1700 is moved towards the ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 1705 may further include a fingerprint sensor, a pressure sensor, an iris sensor, a molecular sensor, a gyroscope, a barometer, a hygrometer, a thermometer, an infrared sensor, and the like. Details are not described herein.

The display unit 1706 is configured to display information entered by a user or information provided for a user. The display unit 1706 may include a display panel 17061. The display panel 17061 may be configured in a form of a liquid crystal display (LCD), an organic light-emitting diode (OLED), or the like.

The user input unit 1707 may be configured to receive input numeral or character information, and generate key signal input related to user setting and functional control of the terminal. The user input unit 1707 includes a touch panel 17071 and another input device 17072. The touch panel 17071 is also referred to as a touchscreen, and may collect a touch operation performed by a user on or near the touch panel 17071 (such as an operation performed by a user on the touch panel 17071 or near the touch panel 17071 by using any proper object or accessory, such as a finger or a stylus). The touch panel 17071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 1710, and can receive and execute a command sent by the processor 1710. In addition, the touch panel 17071 can be implemented in various types such as resistive, capacitive, infrared, and surface acoustic wave. In addition to the touch panel 17071, the user input unit 1707 may further include the another input device 17072. The another input device 17072 may include but is not limited to at least one of a physical keyboard, a functional button (such as a volume control button or a power on/off button), a trackball, a mouse, or a joystick. Details are not described herein.

The touch panel 17071 may cover the display panel 17061. When detecting the touch operation on or near the touch panel 17071, the touch panel 17071 transmits the touch operation to the processor 1710 to determine a type of a touch event, and then the processor 1710 provides corresponding visual output on the display panel 17061 based on the type of the touch event. Although in FIG. 17, the touch panel 17071 and the display panel 17061 are configured as two independent components to implement input and output functions of the terminal, in some embodiments, the touch panel 17071 and the display panel 17061 can be integrated to implement the input and output functions of the terminal. Details are not limited herein.

The interface unit 1708 is an interface for connecting an external apparatus to the terminal 1700. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 1708 can be configured to receive input (for example, data information and power) from the external apparatus and transmit the received input to one or more elements in the terminal 1700, or transmit data between the terminal 1700 and the external apparatus.

The memory 1709 can be configured to store software programs and various data. The memory 1709 may mainly include a program storage area and a data storage area. The program storage area may store an operating system, an application program required by at least one function (such as a voice playing function and an image playing function), and the like, and the data storage area may store data (such as audio data and a phone book) created based on use of the mobile phone, and the like. In addition, the memory 1709 may include a high-speed random access memory or a nonvolatile memory, for example, at least one disk storage device, a flash memory, or another volatile solid-state storage device.

The processor 1710 is a control center of the terminal, and connects all parts of the entire terminal by using various interfaces and lines. By running or executing a software program and/or a module stored in the memory 1709 and invoking data stored in the memory 1709, the processor 1710 performs various functions of the terminal and data processing, to perform overall monitoring on the terminal. The processor 1710 may include one or more processing units. Optionally, the processor 1710 may be integrated with an application processor and a modem processor. The application processor mainly processes an operating system, a user interface, an application program, and the like, and the modem processor mainly processes wireless communication. It can be understood that the foregoing modem processor may not be integrated into the processor 1710.

The terminal 1700 may further include the power supply 1711 (such as a battery) that supplies power to each component. Optionally, the power supply 1711 may be logically connected to the processor 1710 by using a power management system, so as to implement functions such as charging, discharging, and power consumption management by using the power management system.

In addition, the terminal 1700 includes some function modules not shown, and details are not described herein.

Optionally, an embodiment of the present disclosure further provides a terminal, including a processor 1710, a memory 1709, and a computer program that is stored in the memory 1709 and that can run on the processor 1710. When executing the computer program, the processor 1710 implements the foregoing processes of the shooting method embodiment and a same technical effect can be achieved. To avoid repetition, details are not described herein again.

An embodiment of the present disclosure further provides a non-transitory computer-readable storage medium. The non-transitory computer-readable storage medium stores a computer program, and when executing the computer program, a processor implements the foregoing processes of the shooting method embodiment and a same technical effect can be achieved. To avoid repetition, details are not described herein again. The non-transitory computer-readable storage medium includes a read-only memory (ROM), a random access memory (RAM), a magnetic disk, or an optical disc.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. An element limited by "includes a . . . " does not, without more constraints, preclude the presence of additional identical elements in the process, method, article, or apparatus that includes the element.

By means of the foregoing description of the embodiments, a person skilled in the art may clearly understand that the method in the foregoing embodiments may be implemented by software with a necessary general hardware platform. Certainly, the method in the foregoing embodiments may also be implemented by hardware. However, in many cases, the former is a preferred embodiment. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A shooting method, applied to a first terminal and comprising:
   in a state in which a remote connection for sharing a shooting preview interface is established with a second terminal, receiving and displaying a first preview interface of the second terminal sent by the second terminal;
   receiving a first input performed by a user; and
   outputting first target shooting data in response to the first input, wherein
   the first target shooting data comprises partial or all image information of the first preview interface, and the first target shooting data is a video or an image; wherein
   after the receiving and displaying the first preview interface of the second terminal sent by the second terminal, the method further comprises:
   receiving a first touch input performed by the user;
   obtaining a first input track of the first touch input;
   generating a first shooting adjustment message based on the first input track; and
   sending the first shooting adjustment message to the second terminal, wherein
   the first shooting adjustment information is used by the second terminal to adjust a shooting field of view, and the first shooting adjustment message carries the first input track.

2. The method according to claim 1, wherein after the receiving and displaying the first preview interface of the second terminal sent by the second terminal, the method further comprises:
   receiving a second touch input performed by the user;
   obtaining a second input track of the second touch input;
   generating a second shooting adjustment message based on the second input track; and
   sending the second shooting adjustment message to the second terminal, wherein
   the second shooting adjustment information is used by the second terminal to record a video or take a photo based on the second input track, and the second shooting adjustment message carries the second input track.

3. A non-transitory computer-readable storage medium, wherein the non-transitory computer-readable storage medium stores a computer program, and when a processor executes the computer program, steps of the shooting method according to claim 1 are implemented.

4. The method according to claim 1, wherein before the receiving the first input performed by the user, the method further comprises:
   displaying a target preview interface, wherein
   the target preview interface is an interface obtained by synthesizing image data of the first preview interface with image data of a second preview interface, and the second preview interface is a preview interface collected by a camera of the first terminal; and the first target shooting data is all image data of the target preview interface.

5. The method according to claim 4, wherein after the displaying the target preview interface, the method further comprises:
   receiving a second input performed by the user; and
   updating a background of a target region in the target preview interface in response to the second input, wherein
   the updated background of the target region comprises partial or all of a background in the first preview interface, or comprises partial or all of a background in the second preview interface; and the target region is a display region of the image data of the first preview interface or a display region of the image data of the second preview interface.

6. The method according to claim 4, wherein the target preview interface comprises a segmentation line for distinguishing the image data of the first preview interface from the image data of the second preview interface, and the target preview interface is segmented into a first preview sub-region and a second preview sub-region by the segmentation line; and
   after the displaying the target preview interface, the method further comprises:
   receiving a third input performed by the user for the segmentation line; and
   updating a display area of the image data of the first preview sub-region and a display area of the image data of the second preview sub-region in response to the third input.

7. The method according to claim 1, wherein the first terminal comprises a first screen and a second screen; and before the displaying the preview interface of the second terminal, the method further comprises:
   displaying at least two preview interfaces of the second terminal on the first screen; and
   the displaying a preview interface of the second terminal comprises:
   receiving a fourth input performed by the user on the at least two preview interfaces of the second terminal; and
   in response to the fourth input, displaying the first preview interface that is of the second terminal and that is selected by using the fourth input.

8. The method according to claim 7, wherein after the displaying at least two preview interfaces of the second terminal on the first screen, the method further comprises:
   receiving N times of fifth inputs performed by the user on preview interfaces of N second terminals;
   respectively displaying the preview interfaces of the N second terminals in response to the N times of fifth inputs;
   obtaining N pieces of shooting data generated based on the preview interfaces of the N second terminals; and
   splicing the N pieces of shooting data to generate second target shooting data.

9. The method according to claim 8, wherein the obtaining N pieces of shooting data generated based on the N preview interface of the second terminal comprises:
   receiving a sixth input performed by the user in a case that i-th time of fifth input performed by the user for the i-th second terminal is received and a preview interface of the i-th second terminal is displayed; and
   in response to the sixth input, performing a shooting operation to generate the i-th piece of shooting data, wherein
   the i-th piece of shooting data is an image or a video, i is a positive integer, and i is less than or equal to N.

10. A shooting method, applied to a second terminal and comprising:
    in a state in which a remote connection for sharing a shooting preview interface is established with a first terminal, sending a first preview interface of the second terminal to the first terminal; and
    receiving and displaying a second preview interface of the first terminal sent by the first terminal; wherein after the receiving and displaying the second preview interface of the first terminal sent by the first terminal, the method further comprises:

receiving a first shooting adjustment message sent by the first terminal;

extracting a first input track from the first shooting adjustment message;

determining a target adjustment angle based on the first input track; and in a case that the target adjustment angle is less than or equal to a preset threshold, adjusting a position of a camera lens of the second terminal based on the first input track.

11. The method according to claim 10, wherein after the extracting the first input track from the first shooting adjustment message, the method further comprises:

in a case that the target adjustment angle is greater than the preset threshold, determining a first moving distance and a first moving direction of the second terminal based on the target adjustment angle; and displaying first prompt information, wherein the first prompt information is used to prompt a user of the second terminal to move the second terminal based on the first moving distance and the first moving direction.

12. The method according to claim 10, wherein after the receiving and displaying the second preview interface of the first terminal sent by the first terminal, the method further comprises:

receiving a second shooting adjustment message sent by the first terminal;

extracting a second input track from the second shooting adjustment message;

determining a second moving direction and a second moving distance of the second terminal based on the second input track; and displaying second prompt information, wherein the second prompt information is used to prompt a user of the second terminal to move the second terminal based on the second moving distance and the second moving direction in a process of recording a video or taking a photo.

13. A terminal, comprising: a processor, a memory, and a computer program that is stored in the memory and executable on the processor, wherein when the computer program is executed by the processor, steps in the shooting method according to claim 10 are implemented.

14. A non-transitory computer-readable storage medium, wherein the non-transitory computer-readable storage medium stores a computer program, and when a processor executes the computer program, steps of the shooting method according to claim 10 are implemented.

15. A terminal, comprising a processor, a memory, and a computer program that is stored in the memory and executable on the processor, wherein the terminal is a first terminal, and the computer program, when executed by the processor, causes the first terminal to perform:

in a state in which a remote connection for sharing a shooting preview interface is established with a second terminal, receiving and displaying a first preview interface of the second terminal sent by the second terminal;

receiving a first input performed by a user; and outputting first target shooting data in response to the first input, wherein the first target shooting data comprises partial or all image information of the first preview interface, and the first target shooting data is a video or an image; and the computer program, when executed by the processor, causes the first terminal to further perform:

receiving a first touch input performed by the user after the receiving and displaying the first preview interface of the second terminal sent by the second terminal;

obtaining a first input track of the first touch input;

generating a first shooting adjustment message based on the first input track; and sending the first shooting adjustment message to the second terminal, wherein the first shooting adjustment information is used by the second terminal to adjust a shooting field of view, and the first shooting adjustment message carries the first input track.

16. The terminal according to claim 15, wherein the computer program, when executed by the processor, causes the first terminal to further perform:

displaying a target preview interface, wherein the target preview interface is an interface obtained by synthesizing image data of the first preview interface with image data of a second preview interface, and the second preview interface is a preview interface collected by a camera of the first terminal; and the first target shooting data is all image data of the target preview interface.

17. The terminal according to claim 16, wherein the computer program, when executed by the processor, causes the first terminal to perform:

receiving a second input performed by the user; and updating a background of a target region in the target preview interface in response to the second input, wherein the updated background of the target region comprises partial or all of a background in the first preview interface, or comprises partial or all of a background in the second preview interface; and the target region is a display region of the image data of the first preview interface or a display region of the image data of the second preview interface.

18. The terminal according to claim 16, wherein the target preview interface comprises a segmentation line for distinguishing the image data of the first preview interface from the image data of the second preview interface, and the target preview interface is segmented into a first preview sub-region and a second preview sub-region by the segmentation line; and the computer program, when executed by the processor, causes the first terminal to perform:

receiving a third input performed by the user for the segmentation line; and updating a display area of the image data of the first preview sub-region and a display area of the image data of the second preview sub-region in response to the third input.

* * * * *